United States Patent
Kim et al.

(10) Patent No.: US 11,794,415 B2
(45) Date of Patent: Oct. 24, 2023

(54) SYSTEM AND METHOD FOR SIMULATION-ASSISTED ADDITIVE MANUFACTURING INVOLVING ESTIMATING ANISOTROPIC DEFORMATION

(71) Applicant: UT-Battelle, LLC, Oak Ridge, TN (US)

(72) Inventors: Seokpum Kim, Knoxville, TN (US); Ahmed A. Hassen, Knoxville, TN (US); John M. Lindahl, Knoxville, TN (US); Lonnie J. Love, Knoxville, TN (US); Vlastimil Kunc, Knoxville, TN (US); Thomas Feldhausen, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 158 days.

(21) Appl. No.: 17/475,512

(22) Filed: Sep. 15, 2021

(65) Prior Publication Data

US 2022/0088881 A1 Mar. 24, 2022

Related U.S. Application Data

(60) Provisional application No. 63/082,113, filed on Sep. 23, 2020.

(51) Int. Cl.
*B33Y 50/02* (2015.01)
*B29C 64/393* (2017.01)
(Continued)

(52) U.S. Cl.
CPC .......... *B29C 64/393* (2017.08); *B29C 64/386* (2017.08); *B33Y 50/00* (2014.12); *B33Y 50/02* (2014.12)

(58) Field of Classification Search
CPC ..................................................... B33Y 50/02
See application file for complete search history.

(56) References Cited

U.S. PATENT DOCUMENTS

| 2017/0239892 A1* | 8/2017 | Buller | ..................... B29C 64/40 |
| 2018/0095450 A1* | 4/2018 | Lappas | .................. G06T 19/00 |

(Continued)

FOREIGN PATENT DOCUMENTS

| CN | 105058795 A | * 11/2015 | |
| CN | 109808183 A | * 5/2019 | ........... G05B 19/404 |
| KR | 20180115468 A | * 10/2018 | |

OTHER PUBLICATIONS

Hassen, A.A. et al., "Simulation Assisted Design for an Additively Manufactured Autoclave Tool Accounting for an Anisotropic Expansion", United States, 2019, available at https://www.osti.gov/servlets/purl/1607088, pp. 1-10.

(Continued)

*Primary Examiner* — Suresh Suryawanshi
(74) *Attorney, Agent, or Firm* — Warner Norcross + Judd LLP

(57) ABSTRACT

A simulation-assisted additive manufacturing system and method for generating an anisotropic compensation to account for non-uniform deformation due to additive manufacturing and service loading. The predicted deformation may not be fully defined. The present disclosure provides a system and method for estimating the missing deformation data through regression analysis. The present disclosure also provides an integrated framework where the various simulated-assisted design modules are configured for two-way communication and sharing access to changes to the model.

51 Claims, 13 Drawing Sheets

(51) Int. Cl.
    *B29C 64/386*     (2017.01)
    *B33Y 50/00*     (2015.01)

(56) References Cited

U.S. PATENT DOCUMENTS

| | | | |
|---|---|---|---|
| 2018/0307209 A1* | 10/2018 | Chin | B22F 10/28 |
| 2019/0329499 A1* | 10/2019 | Parangi | B22F 10/80 |
| 2019/0377843 A1* | 12/2019 | Chen | G06T 17/20 |
| 2021/0046710 A1* | 2/2021 | Koopmans | B29C 64/106 |
| 2021/0357555 A1* | 11/2021 | Liu | G06F 30/27 |

OTHER PUBLICATIONS

Hassen, A.A. et al.,"The Durability of Large-Scale Additive Manufacturing Composite Molds", United States, 2016, pp. 1-11.

Brenken, B. et al., "Fused filament fabrication of fiber-reinforced polymers: A review", Additive Manufacturing, vol. 21, 2018, pp. 1-16.

Sudbury, T.Z., "An assessment of additive manufactured molds for hand-laid fiber reinforced composites", International Journal of Advanced Manufacturing Technology, 2017, pp. 1659-1664.

Post, B.K., "Big Area Additive Manufacturing Application in Wind Turbine Molds", Solid Freeform Fabrication 2017: Proceedings of the 28th Annual International Freeform Fabrication Symposium, Aug. 9, 2017, pp. 2430-2246.

Kunc, V. et al., "Large Scale Additively Manufactured Tooling for Composites", 15th Japan International Sampe Symposium and Exhibition, 2017, pp. 1-6.

Hassen, A.A. et al., "Additive Manufacturing of Composite Tooling Using High Temperature Thermoplastic Materials", SAMPE Conference Proceedings, 2016, pp. 2648-2658.

Kunc, V. et al., "Investigation of In-Autoclave Additive Manufacturing Composite Tooling", CAMX Conference, 2016, pp. 1-10.

Boey, F.Y.E. et al., "Void reduction in autoclave processing of thermoset composites; Part 1: High pressure effects on void reduction", Composites, vol. 23, No. 4, Jul. 1992, pp. 261-265.

Boey, F.Y.E. et al., "Void reduction in autoclave processing of thermoset composites; Part 1: Void reduction in a microwave curing process", Composites, vol. 23, No. 4, Jul. 1992, pp. 266-270.

Yagi, A. et al., "Design against Distortion for additive manufacturing", Additive Manufacturing, vol. 27, May 2019, pp. 224-235.

* cited by examiner

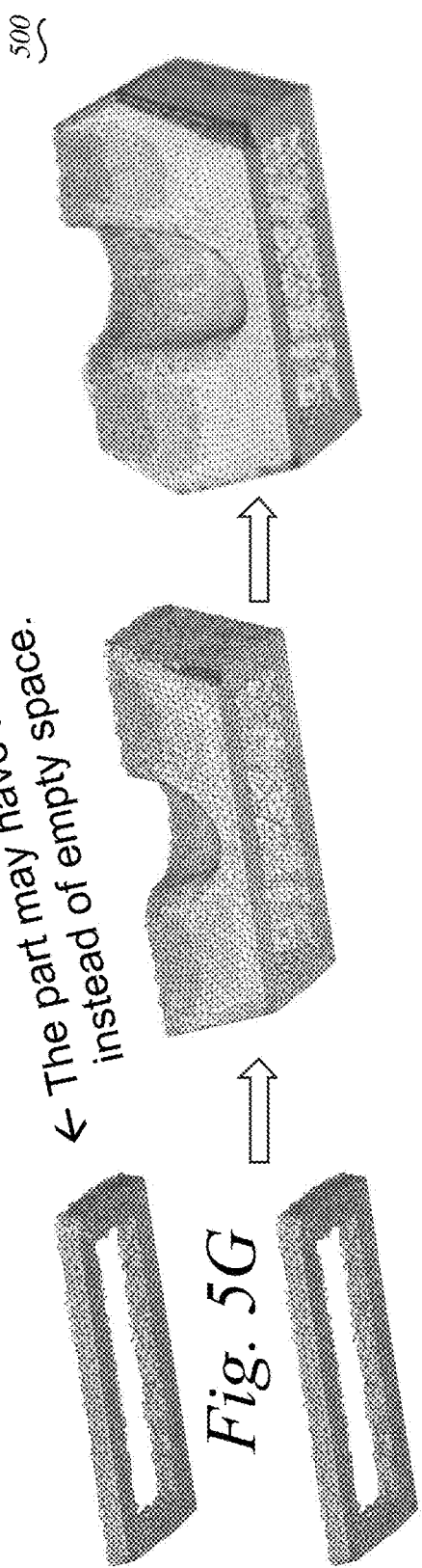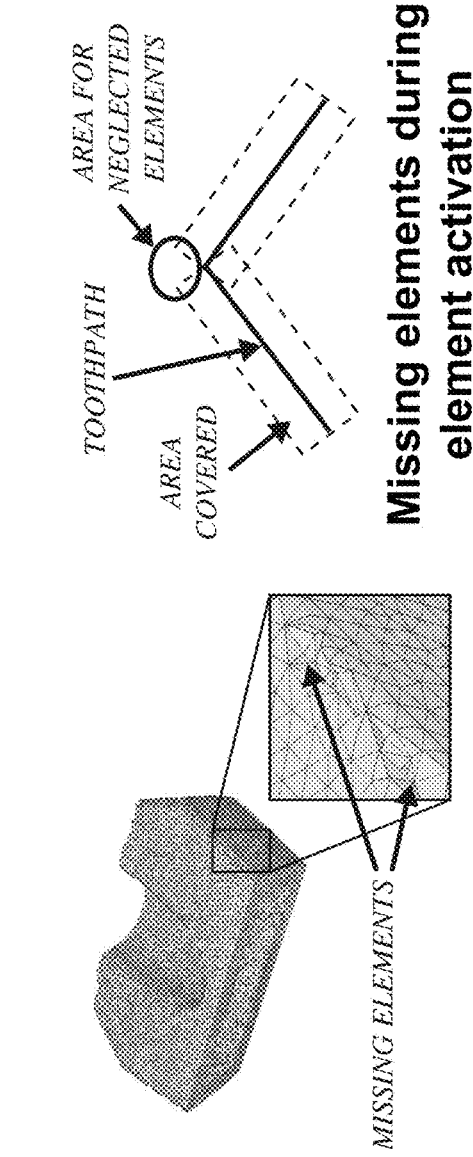
Fig. 5A
Fig. 5B
Fig. 5C
Fig. 5D
Fig. 5E
Fig. 5F
Fig. 5G
← The part may have infill lines instead of empty space.
MISSING ELEMENTS
AREA FOR NEGLECTED ELEMENTS
TOOTHPATH
AREA COVERED
Missing elements during element activation
Printed part

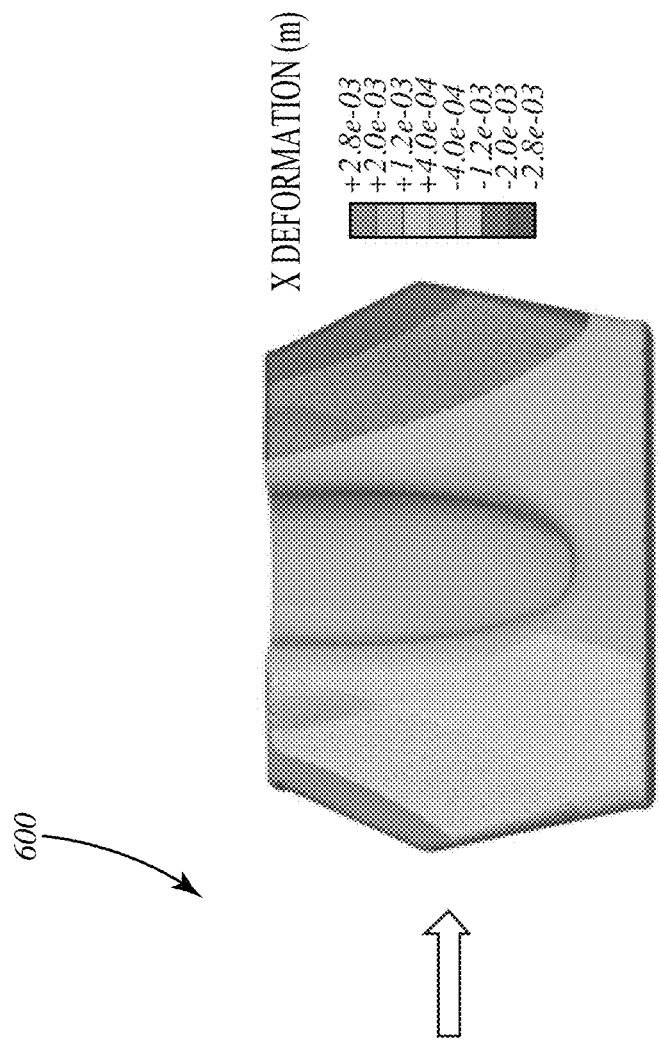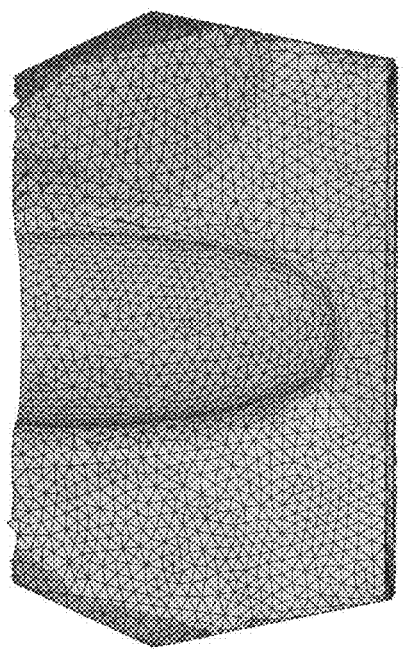
*Fig. 6B*
*Fig. 6A*

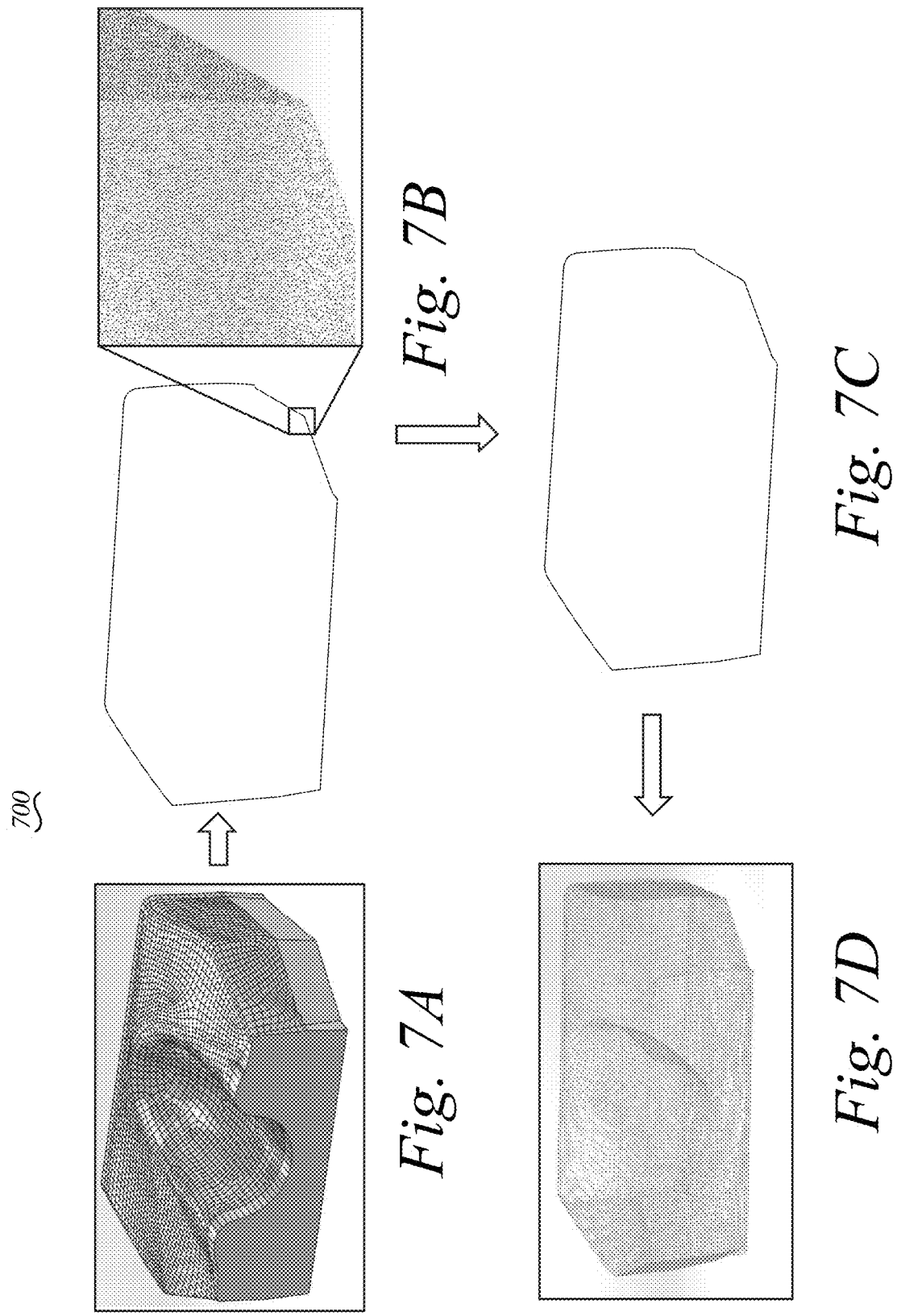

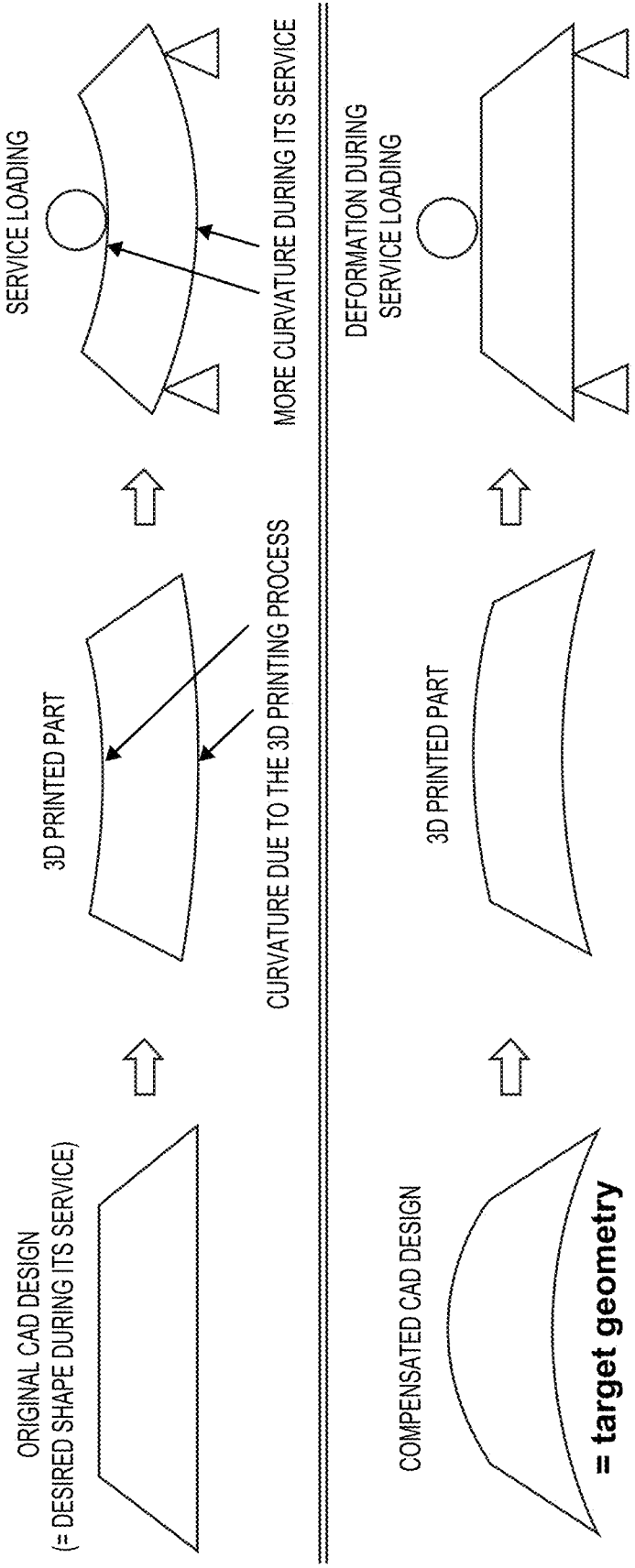

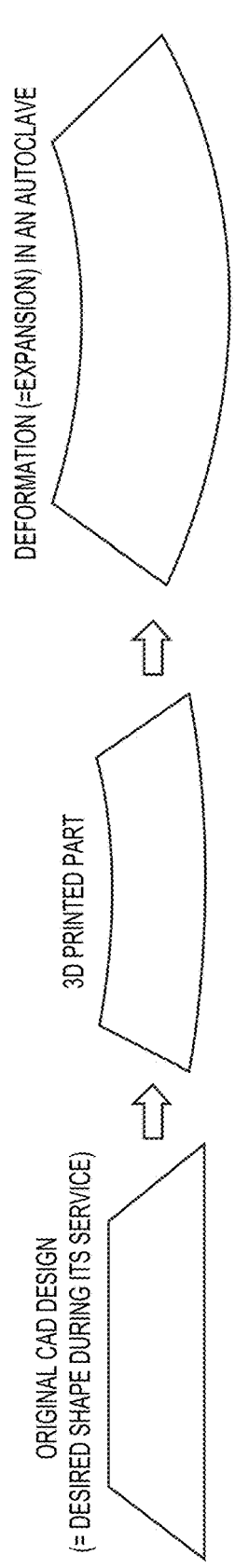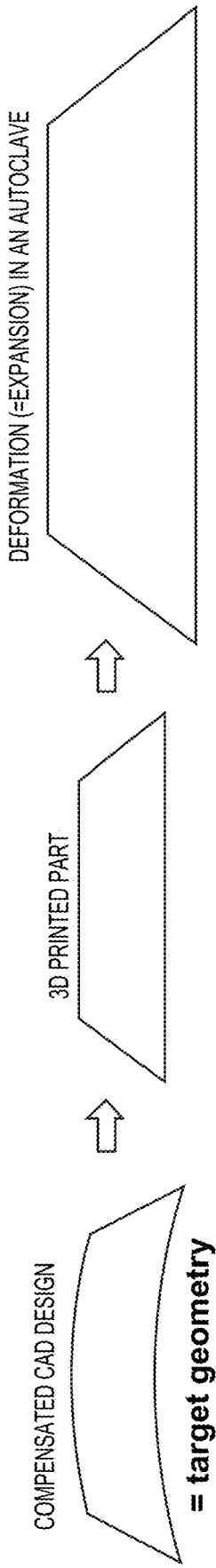

SYSTEM AND METHOD FOR SIMULATION-ASSISTED ADDITIVE MANUFACTURING INVOLVING ESTIMATING ANISOTROPIC DEFORMATION

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to additive manufacturing, and in particular to simulation-assisted additive manufacturing.

BACKGROUND OF THE INVENTION

Popularity of additive manufacturing for tooling and other industrial applications is on the rise. By employing large-scale additive manufacturing, certain unnecessary parts, procedures, time, and labor can be eliminated relative to traditional manufacturing methods. For example, traditional methods for fabrication of a wind turbine blade mold can take upwards of ten months whereas a 3D printed wind turbine blade mold can often be designed, printed, and finished in a month or less.

Despite its advantages, because the additive manufacturing process involves prediction via computational simulation, often additively manufactured parts do not match the geometry on which they are based. That is, in most traditional additive manufacturing techniques a computer model of the target geometry is analyzed by slicer computer software to decide how the additive manufacturing equipment should operate to produce a part with the same geometry as the model. In operation, the slicer software virtually cuts a 3-D model into horizontal 2-D layers that are printed one layer at a time according to layer toolpaths selected by the slicer. The slicer software is configurable with various printer-specific and user-selectable parameters, such as bead width, layer height, speed, and support structure settings. Ultimately, due in part to the prediction/estimation involved in the process, the printed part or post-processed printed part (e.g., after being cleaned, machined, smoothed, painted, and/or having other post-processing performed) often does not match the geometry on which the additive manufacture was based (e.g., a model or an existing part).

There have been some attempts to calculate the distortion during additive manufacturing by modelling the additive manufacturing process with a finite element ("FE") analysis. Two known approaches are the thermo-mechanical approach and the inherent strain method. The thermo-mechanical approach involves an FE thermal analysis or analytical temperature field that leads to calculation of residual stresses and distortion. The thermo-mechanical approach requires numerical modelling approximation of "lumping" layers together in order to complete a simulation without involving prohibitively large FE models. The inherent strain method ignores temperature evolution altogether and assumes a value of plastic strain corresponding to the anticipated thermal strain in each of the Cartesian directions at the inception of cooling from the melting temperature.

In one instance a distortion calculation was used to take corrective action during additive manufacture part design. It involved a stainless steel impeller being additively manufactured using laser powder bed fusion and post-machining. The metal impeller was numerically simulated by applying a FE analysis in order to simulate distortion and residual stresses. The FE distortion was then used in a numerical procedure to reverse distortion directions in order to additively manufacture a new impeller with mitigated distortion. The approach was tailored to laser powder bed fusion additive manufacturing for metal and involved a number of assumptions that make it impractical for other additive manufacturing applications. For example, experimental measurements were necessary in order to calibrate the FE model and it was assumed that the models were all elastic-perfectly plastic.

The distortions caused by various additive manufacturing processes can be particularly problematic. For example, it may not be viable to assume a uniform thermal expansion. Further, some parts have complex geometry that leads to a tortuous deposition path and complex deformations. Accordingly, systems and methods for simulated-assisted additively manufacturing design that have improved efficiency in terms of process time and manual labor, are desirable. Further, systems and methods for simulated-assisted additively manufactured design that provide more accurate geometry are desirable.

SUMMARY OF THE INVENTION

The present invention provides a simulation-assisted additive manufacturing system and method for generating an anisotropic compensation to account for anisotropic deformation due to the additive manufacturing process and service loading. The process includes predicting the deformation by simulating the additive manufacturing process and service loading of a part. In one embodiment, a computer-aided-design (CAD) model is meshed for a finite element analysis (FEA) and also sliced into a slicer-generated design for 3d printing, such as toolpaths set of toolpaths. By activating elements along the toolpath and utilizing property orientation assignment (e.g., material anisotropy) along the toolpath, the deformation field can be generated that represents the estimated deformation of the meshed model due to the additive manufacturing process. The deformation field can be further deformed by simulating the additional deformation that occurs under service loading, such as pressure or temperature changes. The resultant deformation field represents the expected or estimated deformation due to both the additive manufacturing process as well as the service loading. However, the deformation field may be missing some data. Another aspect of the present disclosure provides a system and method for estimating the missing data through regression analysis.

In general, one innovative aspect of the subject matter described in this specification can be embodied in a simulation-assisted method for generating of a target model for additively manufacturing a part, wherein geometry of the target model accounts for anisotropic deformation during additive manufacture and service loading of the additively manufactured part. The method includes accessing, in memory, a model representative of geometry of the part that does not account for anisotropic deformation during additive manufacture of the part and service loading of the additively manufactured part. The method includes slicing the model, with slicer software, to generate an additive manufacture toolpath for additively manufacturing the part that does not account for anisotropic deformation during additive manufacture of the part and service loading of the additively manufactured part. The method includes meshing the model to generate a plurality of meshed elements representative of surface geometry of the part that do not account for anisotropic deformation during additive manufacture of the part and service loading of the additively manufactured part. The method includes accessing, in memory, additive manufacture anisotropic deformation information and service loading anisotropic deformation information. Additive manufacture and service loading of the part is simulated based on the additive manufacture toolpath, the plurality of meshed elements representative of surface geometry of the part, the additive manufacture anisotropic deformation information, and the service loading anisotropic information to generate a plurality of simulated additively manufactured and service loaded mesh elements accounting for anisotropic deformation due to additive manufacturing and service loading. The simulating additive manufacture and service loading of the part includes neglecting a subset of the plurality of meshed elements whereby fewer simulated additively manufacture mesh elements than the plurality of meshed elements are generated, estimating anisotropic deformation due to additive manufacturing and service loading of the neglected subset of the plurality of meshed elements based on both the simulated additively manufactured and service loaded mesh elements, and the meshed elements representative of surface geometry of the part to supplement the plurality of simulated additively manufactured and service loaded mesh elements accounting for anisotropic deformation due to additive manufacturing and service loading. The method also includes generating the target model for additively manufacturing the part, wherein geometry of the target model accounts for anisotropic deformation during additive manufacture and service loading of the additively manufactured part. The target model is based on a comparison between the supplemented plurality of simulated additively manufactured and service loaded mesh elements that account for anisotropic deformation during additive manufacture of the part and service loading of the additively manufactured part, and the plurality of meshed elements representative of surface geometry of the part that do not account for anisotropic deformation during additive manufacture of the part and service loading of the additively manufactured part.

The foregoing and other embodiments can each optionally include one or more of the following features, alone or in combination. In particular, one embodiment includes all the following features in combination.

In some embodiments, the simulation-assisted method for generating the target model includes accessing additive manufacture anisotropic deformation information includes associating the additive manufacture anisotropic deformation information with the plurality of meshed elements. In some embodiments, the simulation-assisted method for generating the target model includes accessing service loading anisotropic deformation information includes associating the service loading anisotropic deformation information with the plurality of meshed elements.

In some embodiments, the simulation-assisted method for generating the target model includes regression analysis to estimate deformation of the neglected subset of the plurality of meshed elements based on the plurality of simulated additively manufactured and service loaded mesh elements and the plurality of meshed elements representative of surface geometry of the part.

In some embodiments, the simulation-assisted method for generating the target model includes a regression analysis that utilizes a patch-wise regression model to obtain a regression fit of deformed positions of the neglected subset of the plurality of meshed elements due to additive manufacture and service loading of the part based on the plurality of simulated additively manufactured and service loaded mesh elements accounting for anisotropic deformation due to additive manufacturing and service loading neighboring the neglected subset of the plurality of meshed elements.

In some embodiments, the simulation-assisted method for generating the target model includes converting the model to a point cloud, deforming points in the point cloud according to the supplemented plurality of simulated additively manufactured and service loaded mesh elements, converting the deformed point cloud into a deformed model of the part that accounts for anisotropic deformation during additive manufacture and service loading of the additively manufactured part. The method can include generating the target model based on the comparison between the supplemented plurality of simulated additively manufactured and service loaded mesh elements, and the plurality of meshed elements representative of surface geometry of the part includes generating the target model based on the comparison between the deformed model of the part accounting for anisotropic deformation during additive manufacture and service loading of the additively manufactured part and the model representative of geometry of the part that does not account for anisotropic deformation during additive manufacture of the part and service loading of the additively manufactured part.

In some embodiments, the simulation-assisted method for generating the target model includes slicing, meshing, simulating, estimating, and generating the target model steps are automatically and iteratively executed until the comparison between the supplemented plurality of simulated additively manufactured and service loaded mesh elements that account for anisotropic deformation during additive manufacture of the part and anisotropic deformation during service loading of the additively manufactured part, and the plurality of meshed elements representative of surface geometry of the part that do not account for anisotropic deformation during additive manufacture of the part and service loading of the additively manufactured part are substantially similar.

In some embodiments, the simulation-assisted method for generating the target model includes generating a target design file representative of the generated target model, slicing the generated target model based on the target design file, with a slicer, to generate a target model additive manufacture toolpath, additively manufacturing an instance of the part based on the target model additive manufacture toolpath, and surface machining the instance of the part based on the target design file to finalize the instance of the part. The method can include comparing the finalized instance of the part to a ground truth version of the part.

In some embodiments, the simulation-assisted method for generating the target model includes conducting a finite element analysis ("FEA") by activating meshed elements representative of surface geometry of the part according to the additive manufacture toolpath to generate the plurality of simulated additively manufactured and service loaded mesh elements accounting for anisotropic deformation due to additive manufacturing and service loading. The FEA can include selecting meshed elements for activation according to the toolpath, assigning additive manufacturing specific properties to the selected meshed elements based on material anisotropy, assigning service loading specific properties to the selected meshed elements based on material anisotropy, calculating displacement of the meshed elements based on the assigned additive manufacturing and service loading specific properties, and generating the plurality of simulated additively manufactured and service loaded mesh elements accounting for anisotropic deformation based on the calculated displacements of the meshed elements.

In some embodiments, the simulation-assisted method for generating the target model including ignoring internal structure of the model and generating a perimeter toolpath.

In some embodiments, the simulation-assisted method for generating the target model includes the neglected subset of the plurality of meshed elements being neglected due to the toolpath being defined by piecewise linear movements where angle between two linear movements is sufficiently sharp such that certain elements that bead width is not expected to cover the neglected meshed elements.

In some embodiments, the simulation-assisted method for generating the target model includes 3D scanning a ground truth version of a product to obtain a mold for manufacturing the product, wherein the part is the mold.

In some embodiments, the simulation-assisted method for generating the target model includes generating the target model based on the comparison includes geometrically inverting the supplemented plurality of simulated additively manufactured and service loaded mesh elements relative to the plurality of meshed elements representative of surface geometry of the part that do not account for anisotropic deformation during additive manufacture of the part and service loading of the additively manufactured part. Generating the target model can include generating an intermediate model by geometric inversion of the supplemented plurality of simulated additively manufactured and service loaded mesh elements relative to the plurality of meshed elements representative of surface geometry of the part that do not account for anisotropic deformation during additive manufacture of the part and service loading of the additively manufactured part.

In some embodiments, the simulation-assisted method for generating the target model includes slicing the intermediate model to generate an intermediate toolpath, meshing the intermediate model, simulating additive manufacture and service loading of the part based on the intermediate toolpath, the meshed intermediate model, the additive manufacture anisotropic deformation information, and the service loading anisotropic information to generate a simulated surface accounting for anisotropic deformation due to additive manufacturing and service loading, and generating the target model for additively manufacturing the part, wherein generating the target model is based on a comparison between the simulated surface and the intermediate model.

In general, another innovative aspect of the subject matter described in this specification can be embodied in a simulation-assisted method for generating target surface geometry such that when additively manufactured and service loaded the target surface geometry anisotropically deforms into a part. The method includes slicing a model of the part to generate an additive manufacture toolpath, spatially discretizing the model of the part to generate a plurality of discretized elements representative of surface geometry of the part, mapping the toolpath to the plurality of discretized elements representative of surface geometry of the part by activating discretized elements corresponding to the toolpath and assigning orientation vectors to activated discretized elements representative of the toolpath direction, simulating anisotropic deformation of the activated discretized elements based on the assigned orientation vectors to generate a deformation field, and reconstructing the target surface geometry based on the deformation field and the model of the part.

The foregoing and other embodiments can each optionally include one or more of the following features, alone or in combination. In particular, one embodiment includes all the following features in combination.

In some embodiments, the simulation-assisted method for generating the target model wherein the simulating anisotropic deformation accounts for the toolpath having complex deposition directions, anisotropic thermal expansion of extruded beads along the toolpath, and slicer-determined internal geometry.

In some embodiments, the simulation-assisted method for generating the target model includes reconstructing the target surface geometry based on the deformation field and the model of the part includes generating revised model geometry to achieve target dimensions corresponding to the target surface geometry while accounting for anisotropic properties.

In some embodiments, the simulation-assisted method for generating the target model includes mapping the toolpath to the plurality of finite elements representative of surface geometry of the part includes deactivating discretized elements that do not correspond to the toolpath;

In some embodiments, the simulation-assisted method for generating the target model includes estimating anisotropic deformation for a subset of inactivated discretized elements. The estimating can include regression analysis to estimate anisotropic deformation of the subset of inactivated discretized elements based on the activated discretized elements corresponding to the toolpath and assigned orientation vectors. The regression analysis can utilize a patch-wise regression model to obtain a regression fit that estimates anisotropic deformation of the subset of inactivated discretized elements based on neighboring activated discretized elements corresponding to the toolpath and assigned orientation vectors.

In some embodiments, the simulation-assisted method for generating the target model includes spatially discretizing the model of the part includes converting the model to a point cloud to generate a plurality of discretized points representative of surface geometry of the part, mapping the anisotropic deformation estimates to the point cloud, and deforming the point cloud based on the anisotropic deformation simulation and anisotropic deformation estimating, and reconstructing the target surface geometry based on the deformed point cloud and the model of the part.

In some embodiments, the simulation-assisted method for generating the target model includes where the slicing, spatially discretizing, mapping, simulating, and reconstructing the target surface geometry steps are automatically and iteratively executed using the target surface geometry as the model until iterated reconstructed target surface geometry corresponds to geometry that when additively manufactured and service loaded anisotropically deforms into the part.

In some embodiments, the simulation-assisted method for generating the target model includes generating a target design file including representation of the target surface geometry, slicing the target design file, with a slicer, to generate a target model additive manufacture toolpath, additively manufacturing an instance of the part based on the target model additive manufacture toolpath, and surface machining the instance of the part based on the target design file to finalize the instance of the part, and comparing the finalized instance of the part to a ground truth version of the part.

In some embodiments, the simulation-assisted method for generating the target model includes ignoring internal structure of the model and generating a perimeter toolpath.

In some embodiments, the simulation-assisted method for generating the target model includes 3D scanning a ground truth version of a product to obtain a mold for manufacturing the product, wherein the part is the mold.

In some embodiments, the simulation-assisted method for generating the target model includes reconstructing the target surface geometry based on the deformation field and the model of the part includes geometrically inverting the deformation field relative to the model of the part.

In general, another innovative aspect of the subject matter described in this specification can be embodied in a simulation-assisted method for generating a target model for additively manufacturing a part, the target model accounting for anisotropic deformation during additive manufacture and service loading. The method includes accessing, in memory, a computer-aided design (CAD) model representative of geometry of the part, additive manufacture anisotropic deformation information, and service loading anisotropic deformation information, slicing the CAD model, with a slicer, to generate an additive manufacture toolpath for additively manufacturing the part without accounting for the additive manufacture anisotropic deformation information and without accounting for the service loading anisotropic deformation information, discretizing the CAD model to generate a CAD-based meshed model representative of surface geometry of the part including a plurality of CAD-based mesh elements, associating the additive manufacture anisotropic deformation information with the plurality of CAD-based mesh elements, associating the service loading anisotropic deformation information with the plurality of CAD-based mesh elements, simulating additive manufacture of the part based on the generated additive manufactured toolpath, the CAD-based meshed model including the plurality of CAD-based mesh elements, and the associated additive manufacture anisotropic deformation information to generate a simulated meshed model of the additively manufactured part, wherein the simulated meshed model of the additively manufactured part includes a plurality of simulation-based mesh elements, simulating service loading deformation of the simulated additively manufactured meshed model of the additively manufactured part based on the associated service loading anisotropic information to generate a deformation field representing deformation of the CAD-based mesh corresponding to simulation of additive manufacture of the part and simulation of service loading of the simulated additively manufactured part, and reconstructing the target model based on the deformation field and the CAD model representative of geometry of the part.

The foregoing and other embodiments can each optionally include one or more of the following features, alone or in combination. In particular, one embodiment includes all the following features in combination.

In some embodiments, the simulation-assisted method for generating the target model includes where the simulating steps account for the toolpath having complex deposition directions, anisotropic thermal expansion of extruded beads along the toolpath, and slicer-determined internal geometry.

In some embodiments, the simulation-assisted method for generating the target model includes reconstructing the target model based on the deformation field and the CAD model includes generating revised model geometry to achieve target dimensions corresponding to the target model while accounting for anisotropic properties.

In some embodiments, the simulation-assisted method for generating the target model includes estimating anisotropic deformation of a subset of the CAD-based mesh elements.

In some embodiments, the simulation-assisted method for generating the target model includes estimating includes regression analysis to estimate anisotropic deformation of the subset of CAD-based mesh elements based on the deformation field.

In some embodiments, the simulation-assisted method for generating the target model includes where the regression analysis utilizes a patch-wise regression model to obtain a regression fit that estimates anisotropic deformation of the subset of CAD-based mesh elements based on neighboring simulated CAD-based elements.

In some embodiments, the simulation-assisted method for generating the target model includes discretizing the CAD model includes converting the CAD model to a point cloud to generate a plurality of discretized points representative of surface geometry of the part, deforming the point cloud based on the anisotropic deformation simulation and anisotropic deformation estimate, and wherein the reconstructing includes reconstructing the target model based on the deformed point cloud.

In some embodiments, the simulation-assisted method for generating the target model includes generating a target model for additively manufacturing a part of claim 32 wherein the accessing, slicing, discretizing, associating the additive manufacture anisotropic deformation information, associating the service loading anisotropic deformation information, simulating additive manufacture, simulating service loading deformation, and reconstructing the target model steps are automatically and iteratively executed.

In some embodiments, the simulation-assisted method for generating the target model includes generating a target design file including representation of the target model, slicing the target design file, with a slicer, to generate a target model additive manufacture toolpath, additively manufacturing an instance of the part based on the target model additive manufacture toolpath, and surface machining the instance of the part based on the target design file to finalize the instance of the part, and comparing the finalized instance of the part to a ground truth version of the part.

The present invention provides a simple and effective simulation-assisted additive manufacturing system and method. Some embodiments of the proposed system and method are more efficient in process time and manual labor than alternative methods. Some embodiments of the proposed systems and methods provide more accurate part geometry, i.e., the parts actually produced more closely match the desired part geometry.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIGS. 5A-C illustrate different stages of one embodiment of a finite element analysis.

FIGS. 5D-F illustrating an exemplary cause and effect of missing elements during element activation in one embodiment.

FIG. 5G illustrates an alternative of FIG. 5A with infill.

FIGS. 6A-B illustrates a comparison between a deformed finite element mesh and the fit regression deformation field.

FIGS. 7A-D illustrate representative perspective views of a model during deformation field processing.

FIGS. 12A-C illustrate an original CAD model, deformation during 3D printing, and deformation during service loading.

FIGS. 12D-F illustrates a compensated CAD model, deformation partially toward target geometry from 3D printing, and deformation to target geometry from service loading.

FIGS. 13A-C illustrate an original CAD model of an autoclave mold, deformation during 3D printing, and deformation during service loading.

FIGS. 13D-F illustrates a compensated CAD model of an autoclave mold, deformation partially toward target geometry from 3D printing, and deformation to target geometry from service loading.

DESCRIPTION OF THE CURRENT EMBODIMENT

Figure 1:
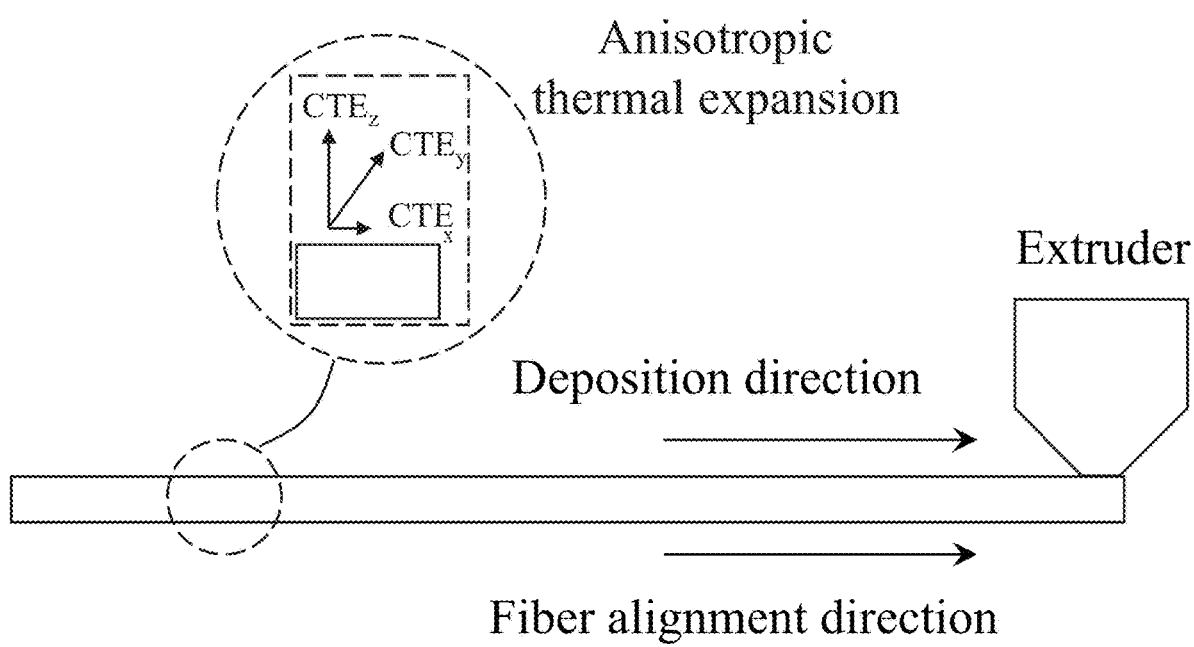
FIG. 1 illustrates a representative side view of anisotropic thermal expansion in extrusion-based additive manufacturing.

The present disclosure is generally directed to systems and methods for simulation-assisted additive manufacturing design. The additive manufacturing process and subsequent service loading of an additively manufactured part can anisotropically distort the resultant part geometry relative to the desired part geometry. This can be particularly troublesome where geometric accuracy provides increased utility, such as where the part is a mold.

Additive manufacturing generally refers to a process of joining materials to make parts from 3D model data, usually layer upon layer. Additive manufacturing equipment can be used to print a part in a controlled manner based on instructions, e.g., in extrusion-based additive manufacturing the instructions often are provided in the form of a toolpath that describes where the printer head moves and other characteristics, such as when to extrude material, movement speed of the printer head, and extrusion rate. In additive manufacturing, the deposited material can be melted, sintered, bound, fused, or otherwise joined to form at least a portion of the 3D component. Examples of additive manufacturing include There are a variety of different categories of additive manufacturing including binder jetting, directed energy deposition, material extrusion, material jetting, powder bed fusion, sheet lamination, and vat photopolymerization.

The term "part" generally refers to an object, e.g., a 3D object to be additively manufactured. A part may be generated using essentially any suitable additive manufacturing system and method. A part may be a portion of a larger part or object, or an entirety of an object. A part may be based on a model, such as a computer-aided design ("CAD") model.

The actual part geometry of an additively manufactured part often does not precisely match the desired part geometry. Multiple factors can contribute to this geometry mismatch. One factor that can affect the part geometry is the deformation that occurs as a result of the additive manufacturing process itself. For example, deformation can occur due to the various thermal changes during the additive manufacturing process, such as due to the melting and cooling that occurs during some additive manufacturing processes. The mismatch of the actual part geometry to the desired part geometry, including local dimensions, can be significant particularly for binder jet additive manufacturing where the volume of the part often shrinks by 30-50% during the sintering process. Extrusion-based additive manufacturing systems often suffer from a non-uniform temperature distribution caused during cooling that results in warpage of the part.

Not only can there be mismatches between additively manufactured parts and the models upon which they are based due to the additive manufacturing process, but there can also be geometry mismatches due to deformation during the part's service cycle or service load. For example, an in-autoclave mold suffers significant expansion during autoclaving due to the high temperature. For a conventionally manufactured metal autoclave mold, the mold design can be uniformly scaled by the expansion amount so that after being subjected to the autoclave conditions, the mold expands to the target autoclave geometry. However, for an additively manufactured autoclave mold made with composite material, e.g., made with fiber-reinforced composite, the mold expands in a non-uniform fashion because of the anisotropic expansion nature of an extruded bead and the tortuous deposition path due to certain materials. Although polymers and other additive manufacturing materials may typically isotropic, they may be engineered to have directionally dependent properties through processing techniques or introduction of anisotropic inducing elements. The non-uniform nature of the expansion due to the additive manufacturing process makes it incredibly difficult to account for expected service loading and is a significant hindrance to additively manufacturing parts expected to undergo deformation due to service loading, such as thermal changes or other types of stress. Accordingly, another factor that can affect part geometry is deformation as a result of the part's service. That is, the additively manufactured part may be exposed to certain forces during its service, these forces can be referred to as the part's service load. For example, where the part is to be subjected to a high pressure environment, it may experience deformation as a result. Or, as another example, where the part being additively manufactured is an in-autoclave mold, it will experience thermal expansion during its service in that function due to the high temperatures involved in the autoclave process.

For a non-additively manufactured metal mold, a simple solution may be to simply scale down the mold design uniformly by the expected expansion amount. However, for a 3D-printed autoclave mold with fiber-reinforced composite, the mold expands in a non-uniform fashion because of the anisotropic expansion nature of an extruded bead, and the deposition path during the printing process being tortuous. That is, the anisotropic deformation of an extruded bead and/or a complex deposition path can have a significant impact on not only the amount of deformation experienced, but its uniformity, which can be particularly challenging to account for in the additive manufacturing design process. The deformation experienced with other types of additively manufactured parts are often complex for similar reasons, because many of the additive manufacturing processes have an anisotropic aspect that impacts the uniformity of the deformations.

One aspect of this disclosure relates to accounting for at least some of the physical deformation that occurs during the additive manufacturing process and/or other service loading of an additively manufactured part. By accounting for this deformation, systems and methods of the present disclosure provide service performance-optimized design. In particular some embodiments of the proposed systems and methods are more efficient in process time and manual labor than alternative methods. Alternatively, or in addition, some embodiments of the proposed systems and methods provide more accurate geometry, i.e., the parts produced more closely match the desired part geometry.

In general, embodiments of the present disclosure account for the deformation by generating a compensation that when used to additively manufacture a compensated part, the compensated part will ultimately more closely match the desired part geometry. The compensation can take a variety of different forms, such as, without limitation, a deformation field relative to a model of the part, a compensated toolpath, or a compensated model. When the compensation is used to additively manufacture a part, because the compensation accounts for at least some of the geometric deformation expected to occur during the additive manufacturing process and/or service loading of the part, the resultant compensated part will more closely match the desired part geometry, which can include a desired pre-service part geometry, for example where the part has not yet been subjected to its expected service loading. An example of this is where a compensated version of an in-autoclave mold is additively manufactured. The additively manufactured mold won't match the desired part geometry until the mold is used and subjected to its service loading (perhaps even until it has been subjected to its service loading for a length of time), however, the part geometry of the compensated in-autoclave mold will reflect a desired pre-service part geometry that, when subjected to the service load deforms into the desired part geometry.

FIG. 1 illustrates an example of the disparity of expansion in different directions that occurs during extrusion-based additive manufacturing. There are a variety of different factors that can affect the anisotropic characteristics of the additive manufacturing process. For example, the direction, speed, and nozzle size can contribute as well as the type of material being extruded and associated anisotropic properties material, as well as bead width, and fiber alignment direction. As the part cools, it will expand according to the coefficient of thermal expansion, which is a coefficient representative of the various factors that affect thermal expansion. The coefficient can be defined in terms of the expansion in the Cartesian directions (CTEx, CTEy, CTEz). In one embodiment, the coefficient of thermal expansion in the in the z direction ($CTE_z$) can differ by 5-20 times relative to the coefficient of thermal expansion in the x direction ($CTE_x$).

Figure 2:
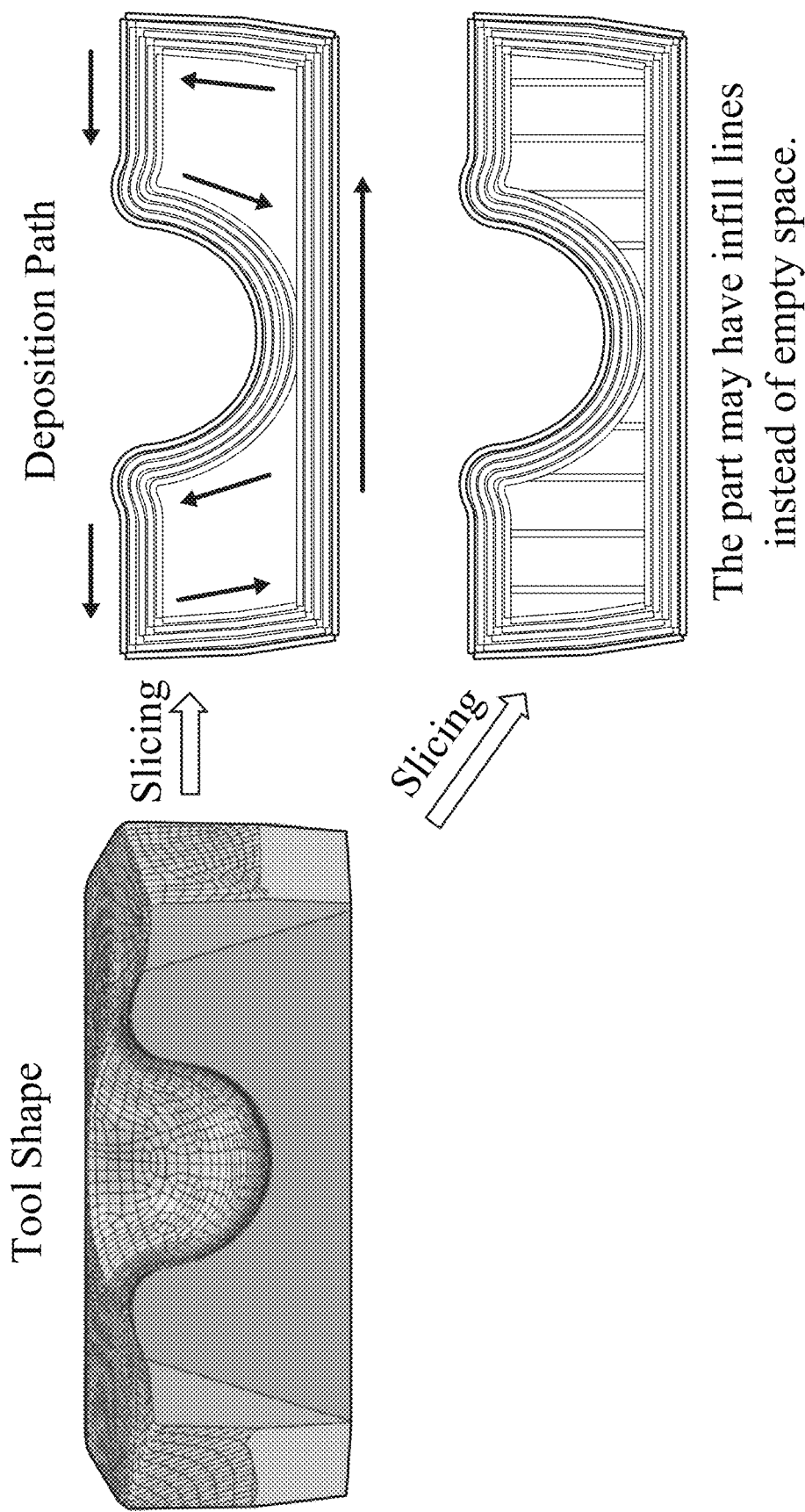
FIG. 2 illustrates a sectional view of a CAD model and two variations of toolpaths generated by slicer software of the sectional view.

The print path, especially for extrusion-based additive manufacturing, can have a significant impact on how the part deforms. FIG. 2 shows an example of a particularly tortuous deposition path sliced from a solid CAD model of an autoclave mold. Because of the tortuous path and anisotropic material properties, it is difficult to intuitively estimate or predict the resultant deformation. However, the deformation can be computationally predicted by FEA software, executed by a controller or other computer system.

In order to account for the anisotropic deformation caused by certain additive manufacturing and service loading processes, embodiments of the system and method of the present disclosure can generate a compensation for use in additively manufacturing a compensated part. The compensation accounts for the deformation by changing the geometry being additively manufactured such that the anisotropic deformation caused by the additively manufacturing process and service loading deform the part to the desired geometry.

Figure 3:
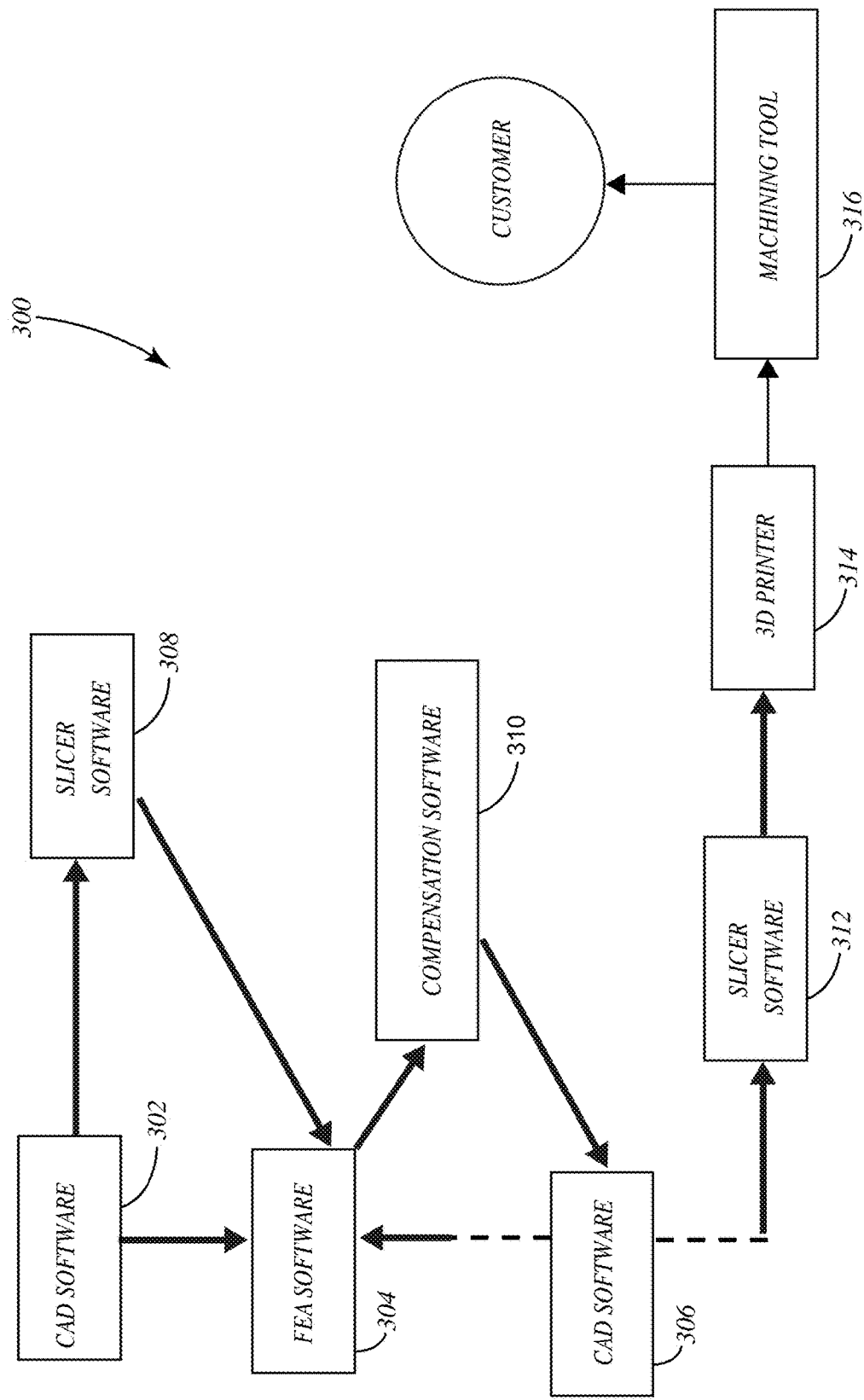
FIG. 3 illustrates a block diagram of one embodiment of the simulated-assisted additive manufacturing system in accordance with the present disclosure.

The present disclosure provides embodiments of systems and methods for generating a compensated model that will deform into a desired part geometry when additively manufactured and loaded during service. Referring to FIG. 3, a block diagram 300 illustrating the various components of one embodiment of a simulation-assisted additive manufacturing system. The system includes CAD software 302, 306, Slicer software 308, 312 finite element analysis (FEA) software 304, compensation software 310, additive manufacturing equipment 314, and a machining tool 316. In the depicted embodiment, the simulated-assisted additive manufacturing system begins with an initial CAD model of a part having desired part geometry and generates a compensated CAD model. The compensated CAD model when sliced and printed into a part accounts for anisotropic deformation due to the additive manufacturing process and/or expected service loading such that the compensated part geometry (after being additively manufactured and service loaded) substantially matches the part geometry of the initial CAD design.

The CAD model of the part can take a variety of different forms and can be stored in memory in a variety of different formats. The CAD model can be a solid model that represents a three dimensional (3D) solid geometry, a surface model that represents the 3D surface geometry, a combination thereof, or some other type of digital representation of the part. The CAD model may or may not be parametric. The CAD model may be accessed, viewed, manipulated, and exported using essentially any type of suitable CAD software. The CAD software can export the model as a design file, such as a standard STP or STEP file The CAD software can export the CAD model as a slicing design file (a stereolithographic or .STL file). In some embodiments, the CAD software, slicing software, and FEA software may communicate utilizing a universal format so as to avoid having to convert the file from format to format.

In the block diagram 300 the CAD software 302 generates or obtains a CAD model of a part with desired part geometry. The CAD model, or derivative forms of the CAD model, can be provided to both the slicer software 308 and FEA software 304. The slicer software 308 can generate additive manufacturing instructions, such as a toolpath based on what it receives from the CAD software. The additive manufacturing instructions can be provided to the FEA software 304 for use in the finite element analysis.

The FEA software 304 can generate a finite element mesh based on the provided CAD model of the part that has desired part geometry, or derivative thereof, provided by the CAD software 302, simulating additive manufacture of the part to deform the finite element mesh into an additively manufactured deformed finite element mesh, simulating service loading on the additively manufactured deformed finite element mesh to further deform it into an additively manufactured and service loaded deformed finite element mesh, and inversely applying the accumulated deformation from the deformed finite element mesh to a point cloud of the model of the part that has the desired part geometry to generate a compensated model. The compensated model, when additively manufactured and loaded during its service will deform into the desired part geometry. The accumulated deformation can be tracked in the form of a deformation field. The deformation field can be described relative to the un-deformed mesh of the model. Further, the application of the accumulated deformation can be accomplished by applying the deformation field from the simulation relative to the point cloud of the original model.

The FEA software 304 run the simulations by conducting a finite element analysis on the finite element mesh from which estimated deformation data can be extracted and communicated to compensation software 310. The compensation software 310 can estimate any missing data, for example with regression analysis, as discussed in more detail below. A point cloud can be used to apply the regression to obtain the deformed point cloud. In turn, the deformed point cloud can be converted to a continuous surface model that is compared to the model of the part that has the desired part geometry so that a determination can be as to whether or not the deformed design is acceptable. If it is not acceptable, the deformation data can be provided to the FEA software 304 to conduct further FEA and further develop the compensation. If the deformed design is acceptable, the inverse geometry can be applied to the model of the part with the desired part geometry to obtain a CAD model that when additively manufactured and service loaded, will deform into the desired part geometry. The compensated CAD model can be provided to the slicer software 312 to generate additive manufacturing instructions for the new compensated part design. The instructions can be provided to a 3D printer 314, which produces the part. Finally, the compensated part can be machined with the machining tool 316, if needed.

Figure 4:
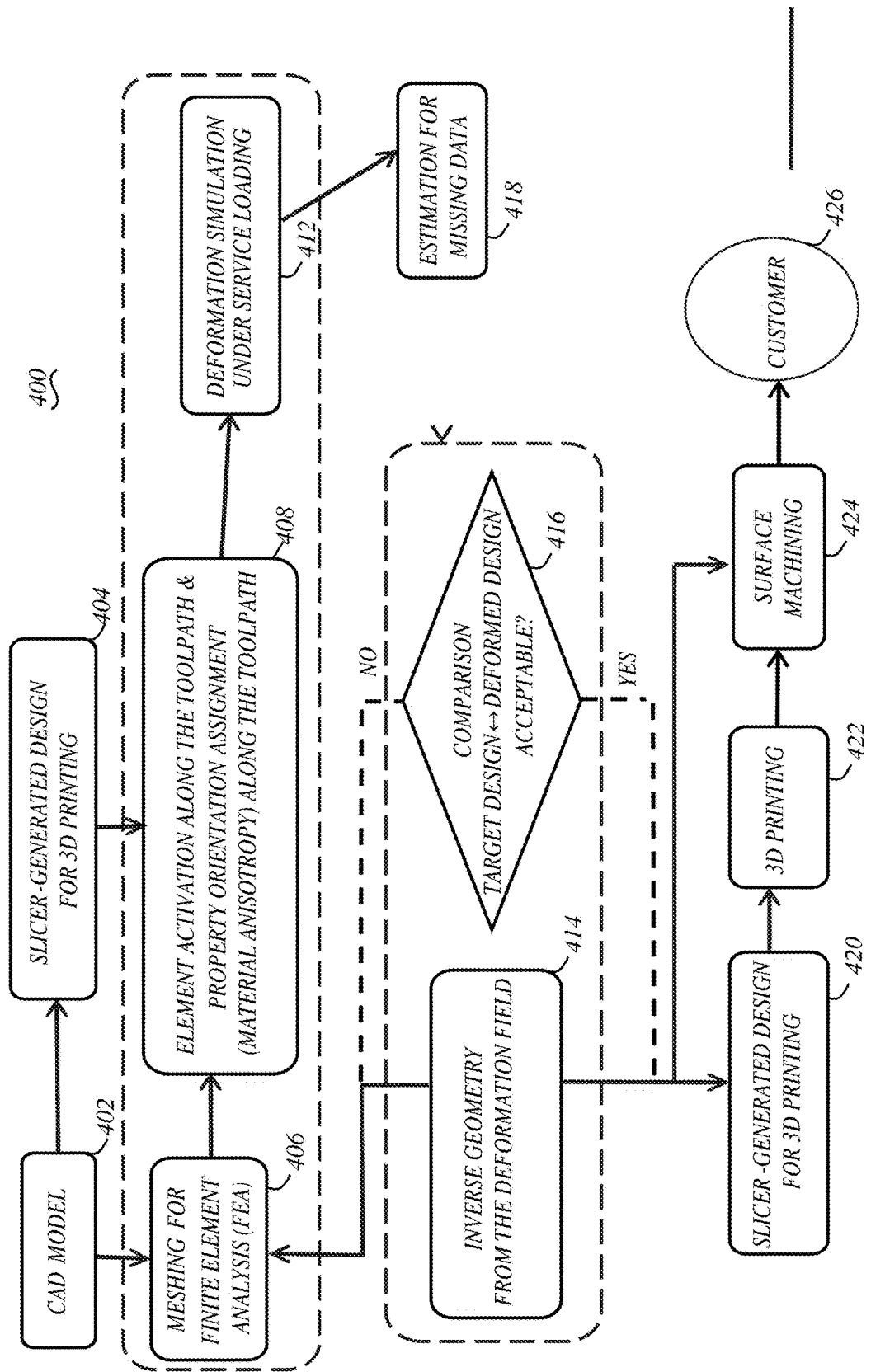
FIG. 4 illustrates a flow chart of one embodiment of a simulated-assisted additive manufacturing method in accordance with the present disclosure.

Referring to FIG. 4, a flow chart 400 illustrating a simulation-assisted additive manufacturing process in accordance with another embodiment of the present disclosure is illustrated. The process begins with a CAD model 402 of a part having desired part geometry. The simulation-assisted additive manufacturing design system communicates a slicer design file to the slicer software for toolpath generation. In many cases, a slicer generates geometries which are not the same as the original CAD design. For example, where the slicer design file provided to the slicer defines a generally hollow part with only a few perimeters as shown in FIG. 2, the slicer may be configured to insert a specified infill structure into the hollow space (e.g., 50%-filled honeycomb structure or support lines as depicted in the alternative construction of FIG. 2). In such cases, the slicer can be configured to communicate any changes it makes to the underlying structure of the model with other modules that might be affected by the change in geometry, such as the simulation module. That is, the addition of slicer generated geometry can impact the various forces being estimated during the simulation and therefore should be considered during the simulation.

It is worth noting that the in-autoclave mold depicted in FIG. 2 was provided in solid CAD model, but the slicer design resulted in a hollow part with an open end. The various slicer settings can be set for a variety of reasons, such as time to print, aesthetics, as well as function. In this case, the hollow design of the in-autoclave mold can ensure that hot air reaches the inside of the mold—this type of hollow mold may not be particularly useful with an all metal mold that is sufficiently conductive, but for a composite mold, the hollow mold can be a significant improvement in the effectiveness and efficiency of the mold.

The CAD model 402 is also provided to a simulation software module that conducts a simulation of the additive manufacturing and service loading of the part. In the depicted embodiment the simulations are carried out by virtue of finite element analysis (FEA). Although FEA is utilized to conduct the simulations in the present disclosure other types of simulation could be conducted in order to obtain the expected or estimated deformation due to the additive manufacturing and service loading. FEA is generally well known and therefore will not be discussed in detail. FEA, sometimes referred to as the finite element method, is a method for solving a mathematical model. It can be applied within the context of various different problem areas such as structural analysis, heat transfer, fluid flow, etc. In essence, FEA involves solving boundary value problems. A boundary value problem is a differential equation together with a set of additional constraints, which are referred to as the boundary conditions. The solution to a boundary value problem is a solution to the differential equation that also satisfies the boundary conditions. Often these take the form of solving partial differential equations in two or three space variables. In general, FEA has two main parts: building a finite element mesh model 406 and activating the elements to solve the model 408, 412.

There are a number of different finite element analysis software programs available that support the conversion of a CAD model into a finite element mesh for finite element analysis. For example, a stereolithography (STL) file or STandard for the Exchange of Product (STP) file that represent the CAD model can be converted into a finite element mesh for the FEA.

Building the finite element mesh model 406 generally involves converting a design file into a finite element mesh by importing nodes that represent the objects shape, creating finite elements between the nodes, assigning material properties to the elements, assigning constraints to the selected nodes, and assigning applied forces to the appropriate nodes. From there, the model elements can be activate to solve a defined problem according to a particular type of analysis, or as in the case with the embodiment depicted in FIG. 4 with multiple analyses 408, 412. For example, in the present disclosure, the thermal deformation of the elements is solved for the various changes in thermals. That is, the heating and cooling during additive manufacture as well as during service loading such as where the additively manufactured part is an in-autoclave mold that is subjected to high temperatures. The present disclosure is not limited to thermal FEA, other types of analysis that affect the deformation of the additively manufactured part can be performed and their results subsequently used in a feedback loop that alters the design to account for the predicted deformation due to the particular FEA performed.

In operation, a processor is configured to build the FEA mesh for the FEA by subdividing a CAD model into smaller, simpler parts that are called finite elements. The conversion of the design file to an FEA mesh does this by providing a particular space discretization in the space dimensions, implemented by the construction of a mesh of the part. The mesh partitions space into elements, sometimes referred to as cells or zones, over which equations can be solved, which then approximate a solution over the larger domain. he shape of the elements can vary depending on the application and the specific implementation. FEA can employ the use of three-dimensional cell shapes, such as tetrahedrons, quadrilaterals pyramids, triangular prisms, hexahedrons, or other shapes.

A visual representation of one embodiment of simulation of additive manufacture is illustrated in FIGS. 5A-5F. In particular, the results of a finite element analysis suitable for use in connection with the present disclosure is depicted in FIGS. 5A-C. The FEA involves activation of mesh elements based on the toolpath generated by the slicer. The analysis effectively simulates the additive manufacture of the part, including the thermal expansion and contraction due to the anisotropic characteristics of the material and the toolpath. FIGS. 5A-C show a visual representation of one exemplary additive manufacturing process simulation of a layer-by-layer deposition process. During this simulation, the directionality of the material properties are assigned to the elements. That is, as each element is activated to simulate that element being deposited, the directionality of the material properties are assigned to that element. FIG. 5A illustrates an example of the simulation after a few layers being printed with hollow/empty space introduced during the slicer design. (FIG. 5G illustrates an alternative view at the same stage of the simulation with infill). FIG. 5B illustrates the simulation after about half of the layers have been printed, and FIG. 5C illustrates the simulation of the part after all of the layers have been printed. The amount of deformation of each element is mapped to a greyscale with darker shades being indicative of more deformation and lighter shades being indicative of less deformation. Although the deformation illustrated in FIGS. 5A-C relates to the FEA of the additive manufacturing process and does not show the simulation of additional deformation from service loading, in alternative visualizations the deformation can be similarly represented. In alternative embodiments, the greyscale can represent temperature during additive manufacture instead of deformation. In alternative embodiments, the greyscale can be a color scale.

During the activation process in some embodiments of the present disclosure, some elements are not activated. The simulation software can be configured in this way for a variety of reasons. Saving time is one reason that fewer that all of the elements are activated in some embodiments. Further, another reason is that if all of the elements are activated, regardless of the whether the toolpath crosses or intersects the element or not, then the design from the FEA will essentially be the same as the design from the CAD model, but it may not necessarily match the design resultant from the toolpath of the slicer. For example, if a simple box shaped part is the desired part geometry, a CAD file of a box can be provided. If a decision is made to 3D print a fully solid part that has no intentional voids or empty internal volumes, then during simulation, the general preference is to activate all of the elements because the CAD design, FEA design, and slicer design are all the same. However, where the desired part geometry is a hollow 3D structure or with a certain infill pattern with intentional empty volume, then this can be achieved by changing settings in the Slicer. In this situation, it is generally preferable not to activate all of the elements in the FEA. Instead, elements should be activated only where material is deposited. The process of determining material deposition location is generated by the slicer, not by the CAD model nor the FEA analysis. However, Slicer and FEA (or CAD) are not traditionally configured to communicate feedback with each other and do not communicate with each other directly. Therefore, the FEA simulation software package does not know the new design made by the Slicer. Unless the changes are communicated to the FEA from the slicer, for example by providing the FEA software the Gcode (or toolpath) so that it can estimate the changes in the design. If this information is available to the FEA software, this design estimation process in FEA can be accomplished by selective element activation.

Many elements are purposely excluded from the analysis in order to save time. In embodiments where the goal is to define a deformation field, elements that are not near a designated surface or surfaces of interest and that do not have or are unlikely to have an appreciable effect on elements that are on or near such surfaces, can be left un-activated. While this can save time on the analysis, it can also lead to missing elements during element activation.

One reason for missing elements is that the toolpath is defined by piecewise linear movements, and if the angle between two linear movements is sharp, elements that are not covered by the thickened path are often neglected as shown in FIG. 5E. Put another way, because the current embodiment of FEA activates (i.e., simulates) only those elements that intersect the toolpath (or intersect the area covered by the toolpath by the simulation), then any element that does not intersect the toolpath (or the simulated area covered by the toolpath) will not be activated. As shown in FIGS. 5E-F, there is an area that can have neglected elements due to the angular nature of the toolpath relative to the curved nature of the actual printed part shown in FIG. 5F. That is, any elements that fall entirely outside of the toolpath or the simulated area of the toolpath will not be activated, if any of those elements fall without the "area for neglected elements highlighted in FIG. 5E, missing elements such as those shown in FIG. 5D can result. Put another way, any neglected elements will not be activated and therefore no deformation data will be calculated. As shown in FIG. 5D, the deformed model may have missing elements because no deformation data was calculated for the corresponding element.

If there are missing elements, the deformed model or design file reconstructed from the FEA simulation will have a significant amount of inaccuracy due to the missing elements. Another aspect of the present disclosure is directed to accounting for the missing elements so that the simulation is sufficiently accurate.

FIG. 6A illustrates one embodiment of the simulated finite element method results in the form of a deformed finite element mesh while FIG. 6B illustrates a fitted field of deformation. In particular, due to non-activated surface elements, the deformed finite element mesh does not fully include the entire surface. However, by using a regression model, the deformation data for the missing elements can be estimated. The fitted field of deformation shown in FIG. 6B is a result of a comparison between the simulation result and the regression data. In some embodiments, instead of using a regression model for the entire surface, a patch-wise regression model or regression estimation for only missing points can be utilized. In one embodiment, the regression model is derived from a quadratic multivariable (x,y,z) equation. The regression fit to a quadratic equation provides a deformation field close to that of the original simulation result, as presented in Table 1.

TABLE 1

$$\begin{cases} \Delta x = k_1 x^2 + k_2 y^2 + k_3 z^2 + k_4 xy + k_5 yz + k_6 zx + k_7 x + k_8 y + k_9 z + k_{10} \\ \Delta y = k_{11} x^2 + k_{12} y^2 + k_{13} z^2 + k_{14} xy + k_{15} yz + k_{16} zx + k_{17} x + \\ \quad k_{18} y + k_{19} z + k_{20} \\ \Delta z = k_{21} x^2 + k_{22} y^2 + k_{23} z^2 + k_{24} xy + k_{25} yz + k_{26} zx + k_{27} x + \\ \quad k_{28} y + k_{29} z + k_{30} \end{cases}$$

A user can pre-define the surface or surfaces of interest before element activation. Because all the elements of the surface of interest should be deformed as a result of the additive manufacturing process, each of the elements should have associated deformation data. If any element on a surface of interest was not activated, the deformation of that element should be estimated. Further, in some embodiments, no surfaces of interest are defined and instead all surfaces or a certain category of surfaces that are systematically or programmatically determined are defined as surfaces of interest. The regression analysis is just one example of the type of analysis that can be conducted to estimate the missing deformation data. Other types of analysis can be performed. In addition, the regression analysis can be performed multiple times to reach a second order, third order, etc. depending on the desired level of confidence.

Once the regression analysis is complete, the new target geometry can be restructured by the following procedure as shown in FIG. 7. A point cloud of the surface is used for the conversion of the geometry. FIG. 7A shows the original CAD design of the part having the desired part geometry. FIG. 7B shows that CAD design converted into a point cloud. Next, the deformation field from the simulation or regression model is inversely applied to the point cloud of the original CAD model to obtain the deformed point cloud of FIG. 7C. The inverse application of the deformation field can be accomplished by switching the sign associated with each deformation value. For example, the inverse application of the deformation field to a point cloud of the original model can be considered in terms of thermal distortion. From the FEA results, it may be known that a part is going to be smaller when it cools, by inverting the deformation field and applying it to the original model, it will effectively oversize the original model. The deformed point cloud can then be converted back into a continuous surface CAD model as shown in FIG. 7D. By applying the inverse of the deformation field to shift the CAD model surface, the deformation due to the additive manufacturing and service loading that is reflected in the deformation field is generally accounted for because when that model is additively manufactured it will deform substantially closer to the desired part geometry.

It is worth noting that the continuous surface CAD model shown in FIG. 7D can be referred to as target geometry. Target geometry is an appropriate name because when the target geometry is printed and loaded during its service, it will essentially deform into the original part having the desired part geometry. Put another way, the target geometry is the same as the deposited geometry after post-processing (e.g., machining), yet before service loading. The target geometry can be limited to simply surface geometry that essentially will be a different size/shape from the actual desired part because it will change shape/size due to the additive manufacturing process and due to service loading (e.g., autoclave thermal reaction).

FIGS. 12A-F illustrate different views of an exemplary uncompensated bridge and compensated bridge component. The uncompensated bridge component CAD design with desired part geometry during service is shown in FIG. 12A. A warped version of the uncompensated bridge component due to the additive manufacturing process is depicted in FIG. 12B. And, a further warped version of the uncompensated bridge component due to the bridge component experiencing additional forces during service as a bridge is illustrated in FIG. 12C. FIG. 12D illustrates a compensated CAD design with target geometry that when deformed from additive manufacture (FIG. 12E) and service loading (FIG. 12F) the compensated part is deformed into a part that substantially matches the original CAD design having the desired part geometry/shape (FIG. 12A).

FIGS. 13A-F illustrate different views of an exemplary autoclave mold model and compensated autoclave mold model. The uncompensated mold CAD design with desired part geometry during service is shown in FIG. 13A. A deformed version of the uncompensated mold, due to the additive manufacturing process, is depicted in FIG. 13B. And, a further deformed version of the uncompensated mold component, due to the mold part experiencing additional forces during service as an autoclave mold is illustrated in FIG. 13C. FIG. 13D illustrates a compensated CAD design of an autoclave mold model with target geometry that when deformed from additive manufacture (FIG. 13E) and service loading (FIG. 13F) the compensated part is deformed into a part that substantially matches the original CAD design having the desired part geometry/shape (FIG. 13A). In this case, the deformation during the service loading is thermal expansion.

The inversely deformed CAD model may be referred to as a compensated or corrected model because it corrects/compensates for the unwanted deformations. Printing the compensated model may not necessarily provide the precise target geometry that when additively manufactured and service loaded deforms into the desired part geometry. However, it should be substantially closer than the originally deformed part. Further, an iteration cycle can be utilized until the results converge, this is represented by the convergence check step 416 in the FIG. 4 flowchart.

Figure 8A:
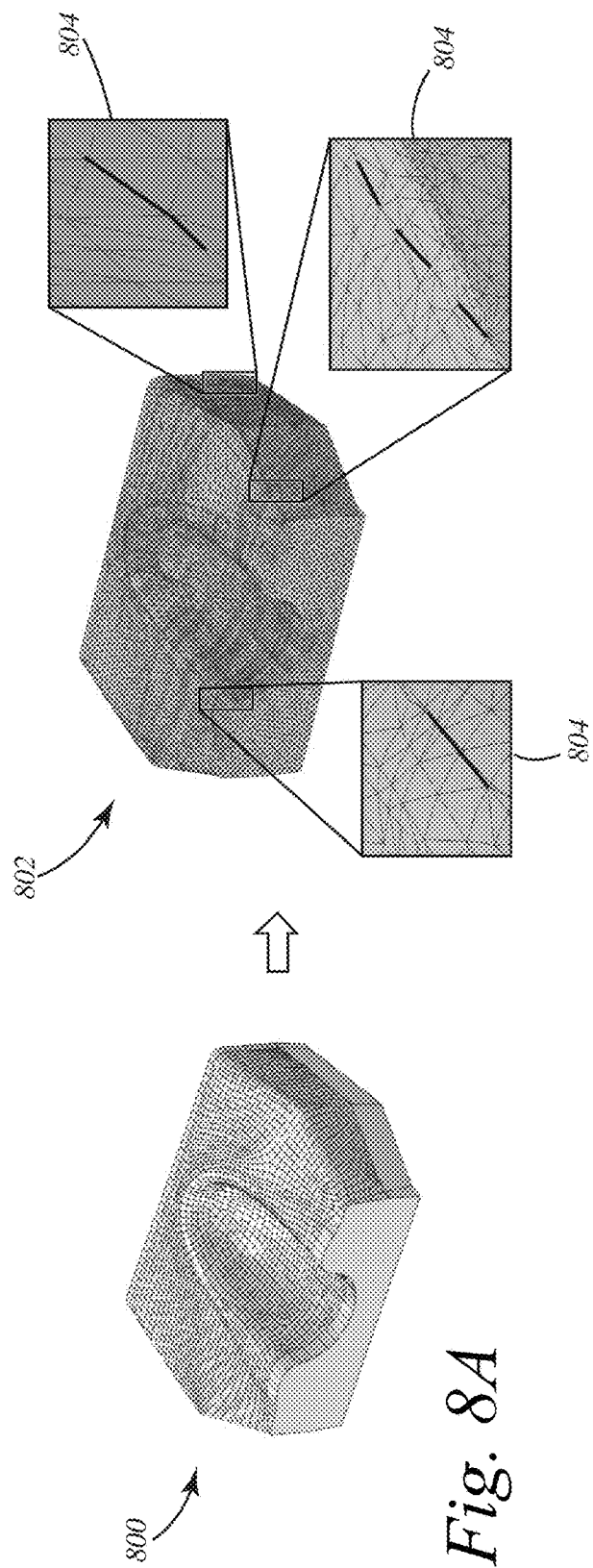
FIGS. 8A-B illustrate one embodiment of a process of the present disclosure starting from an existing part without a CAD file.

The method of deformation field processing illustrated in FIGS. 7A-D can be particularly helpful for surface machining. By estimating the displacement of each point, conversion with no or minimal deviation can be provided.

Where the desired part geometry is not available in a CAD file or other digital representation, but a physical version of the part is available, the physical part can be 3D scanned using a suitable 3D scanning technique. Alternatively, the part can be replicated by replicating a mold/die for the part by a suitable 3D scanning technique. A CAD model 800 derived from the 3D scanning process can include multiple scanned patches as illustrated in FIG. 8A. In such a case, a finite element meshing process may be used to generate a finite element mesh 802 that introduces several highly distorted elements shown in the close-up views 804 which can result in the failure of computation.

Figure 8B:
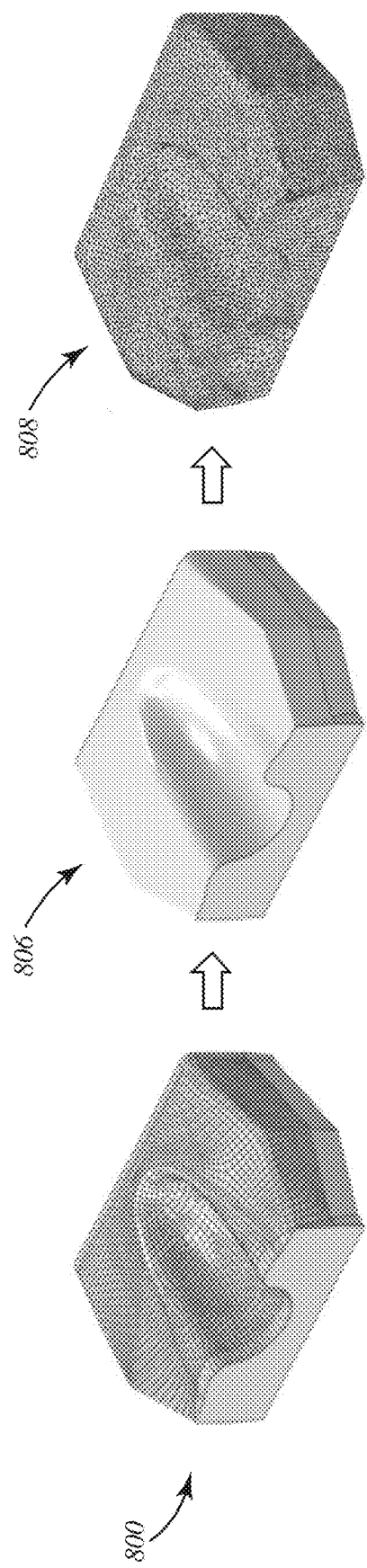

In another aspect of the present disclosure, a merging process of the patches as shown in FIG. 8B is conducted. That is, surface smoothing can be obtained by merging patch to obtain a computationally stable finite element mesh. To reduce inaccuracies due to the surface smoothing, the original CAD design 800, not the smoothed design 806, can be used for the point cloud conversion despite the smoothed design being used to generate the finite element mesh 808 in this embodiment and ultimately estimate the deformation field. That is, the deformation field, once estimated, can be applied (inversely) on the point cloud from the original CAD design, not on the point cloud of the smoothed surface.

Figure 9:
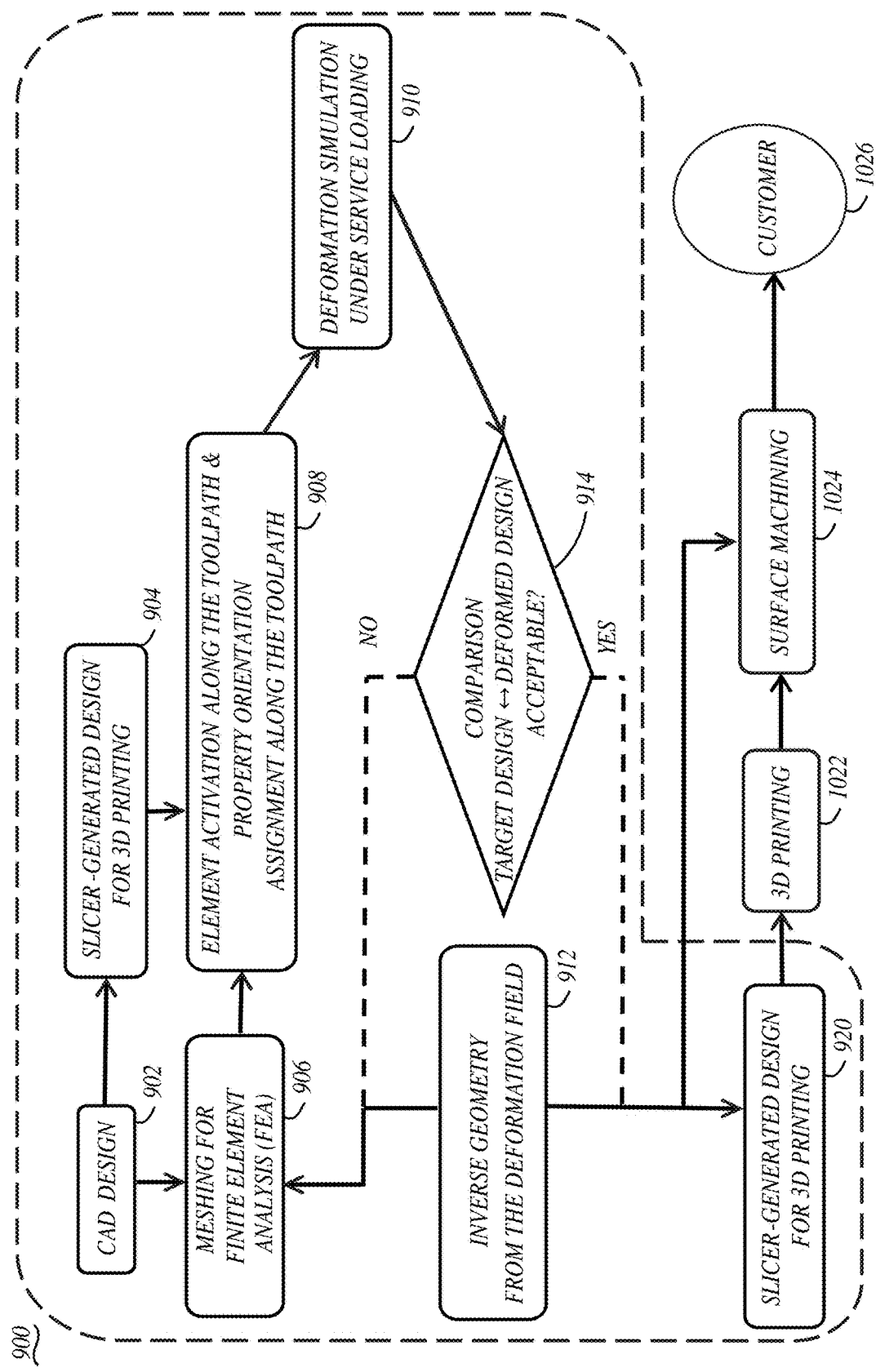
FIG. 9 illustrates a flowchart for one embodiment of a simulated-assisted additive manufacturing method using an integrated design framework for CAD modeling, slicing, FEA simulation, and a controlled feedback loop.

Some embodiments of the present disclosure relate to processes and data conversion techniques for an end-to-end flow from an initial design to a final product. Specifically, referring to FIG. 9, an integrated framework is illustrated. The integrated framework includes the CAD process 902, the slicing processes 904, 920, the meshing process 906, the element activation and orientation assignment process 908, the deformation simulation process 910, the geometry comparison process 914, and the geometry inversion process 912. The integrated framework can be provided as a single software package or as separate modules that are designed to communicate with one another, or have a shared memory space. The different modules/processes, in particular the CAD module 902, FEA mesh module 906, and slicer module 904 can be implemented in a cohesive framework where any changes to the CAD model, toolpath, or finite element mesh are automatically fed back to the other modules so that the CAD model, toolpath, and finite element mesh are automatically synchronized. Each module can include instructions for converting any changes made in that module into an updated version of the model passed to it. For example, where a CAD model is provided to the slicer and the slicer makes one or more changes that would affect the CAD model, the slicer software is programmed to automatically update the CAD model or recreate an updated CAD model and provide it to the CAD module. The same is true of the various settings and options that can be altered. For example, if the infill percentage is altered in the slicer that change can be updated in the CAD model (or a new CAD model) so that the CAD model reflects the actual part being manufactured. Those changes can be cascaded down the line to other modules, for example, the changes can be updated in the finite element mesh so that the FEA software is aware of the change and the simulation can accommodate for the change. Because the FEA analysis relies on both the finite element mesh, but also the toolpath, changes to one that would affect the other can have a significant impact on the simulation.

Put another way, the simulation-assisted additive manufacturing design can be automatically provided by an integrated framework. Instead of distinct programs, such as a CAD program, slicer program, FEA mesh program, and compensation program working separately based on the input provided explicitly to them, they can be integrated into a system that automatically updates the different models so that the different formats and types of models utilized throughout the software are based on the same ground truth. Often times in additive manufacturing changes in design are conducted in the slicer software itself. For example, the number of perimeters may be changed until reaching a desired set of characteristics on the print job. Or, in some cases, the print will fail at a lower number of perimeters and so the value is increased. The number of perimeters in the build can have a significant impact on the geometry of the part. Because this particular method relies on an alignment between the finite element mesh and the toolpath, the ability to keep all of the models being used in the software synchronized is meaningful and provides an appreciable benefit. Further, design changes can be implemented more easily or conveniently in some models rather than others. For example, where the part is intended to be made hollow or with a particular type of infill, those changes can be made seamlessly and quickly using slicer software. However, make non-uniform specific changes to the geometry can be a challenge in the slicer—but relatively straightforward with CAD software. Likewise there may be changes that are simpler or more efficient to make in the FE mesh, rather than the CAD or slicer. Because the different models all automatically convert and share into the other model forms, the ultimate output is more reliable than otherwise.

By synchronizing the various models in the system, or at least the models utilized in the FEA, the amount of missing data can be significantly reduced. FIGS. 10A-C and 11A-B help to illustrate the difference between a system where the CAD, Slicer, and FEA software do not communicate and are not integrated with each other, and a system where they communicate and/or are integrated into a single system or framework.

Figure 10A:
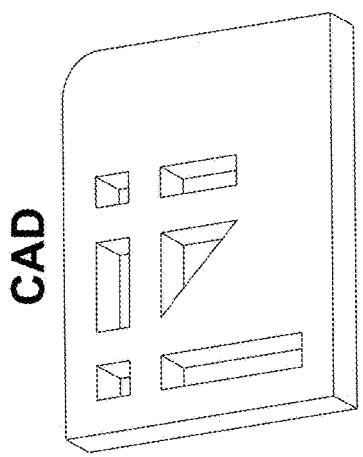
FIG. 10A illustrates an exemplary CAD view of a model of a part.
Figure 10B:
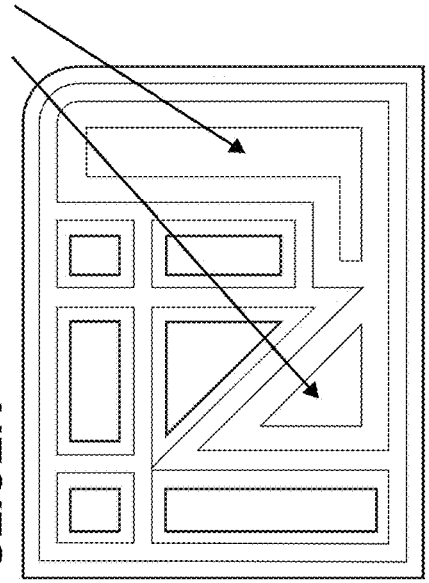
FIG. 10B illustrates an exemplary toolpath overlaid onto the CAD of FIG. 10A.
Figure 10C:
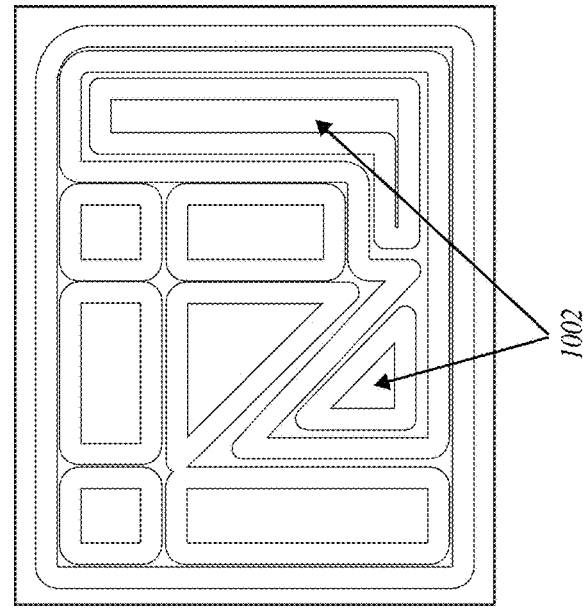
FIG. 10C illustrates a printed layer of the toolpath of FIG. 10B showing voids not present in the CAD model.

Referring to FIG. 10A an exemplary perspective view of a CAD model having a plurality of openings is illustrated. In FIG. 10B the slicer generated toolpath is shown overlaid on the CAD of FIG. 10A, with an indication of where no infill is being provided by the slicer due to the user selected settings. It is not uncommon to effectively design on the fly using slicer settings to obtain a desired design. For example, the slicer generates voids 1002 due to the particular settings, such as number of perimeters and bead width. As the slicer settings are altered, so too is the precise toolpath. The user selecting the slicer settings may have a preference for voids 1002 or other features developed as a result of the selection of certain slicer features. Of course, these slicer design changes can have ramifications to the geometry of the final part, and to the original CAD on which that part was based. FIG. 10C illustrates the resultant printed layer according to the toolpath.

Figure 11A:
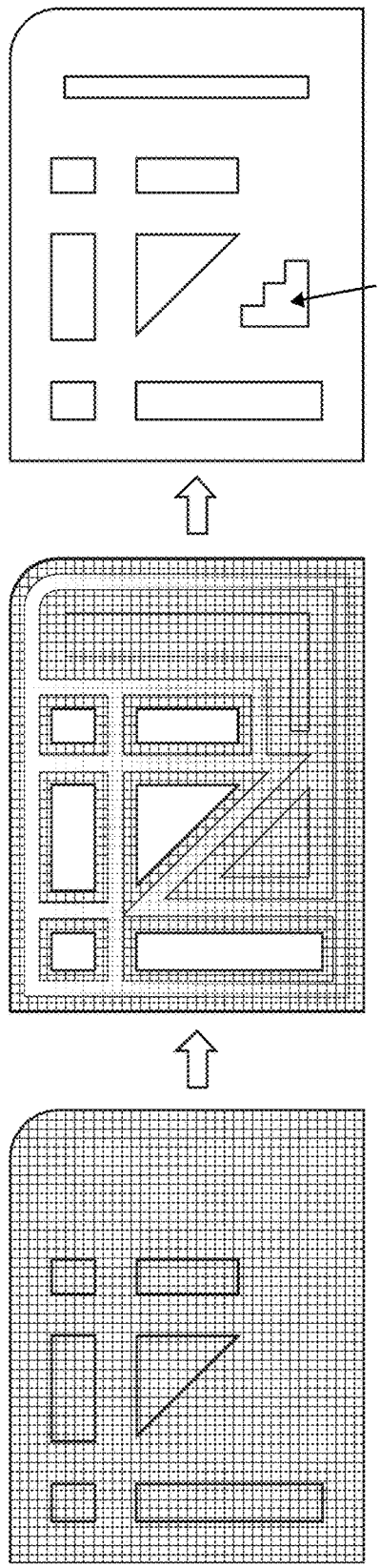
FIG. 11A illustrates one embodiment of an FE mesh, toolpath alignment, and FEA that results in missing data.

Referring to FIG. 11A, a finite element mesh at different points in the simulation is illustrated a part model at different stages of the simulated-assisted additive manufacturing design process is illustrated. The CAD model from FIG. 10A is converted to a finite element mesh and because the CAD model does not have voids 1002, no corresponding voids are generated in the mesh. Next, the simulation aligns the toolpath with the mesh so that the elements can be activated based on the toolpath and the area covered by the toolpath. After this activation, only a portion of the voids 1002 are created and they do not reflect the desired design. That is, because the toolpath does not carry with it any information about the voids 1002, the FEA mesh does not realize there are supposed to be voids 1002. However, because the FEA only activates elements that intersect the toolpath or area it covers, some of the data is missing and an inaccurate surface is created. This is essentially the result of changes in infill due to the slicer not being communicated to the other models.

Figure 11B:
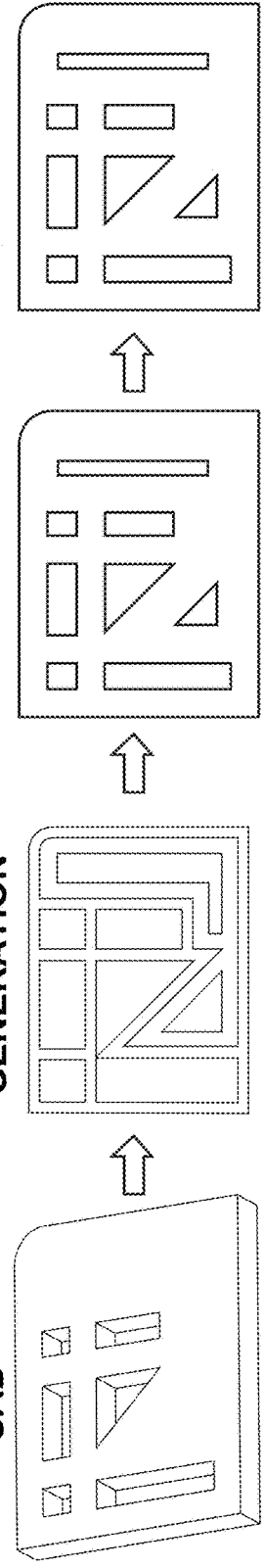
FIG. 11B illustrates one embodiment of a CAD model, toolpath, regenerated CAD, and finite element mesh where the CAD module, slicer module, and simulation module communicate with each other.

In contrast to FIG. 11A, FIG. 11B illustrates where the CAD/Slicer/FEA communicate with each other, the accurate surface design can be maintained. In particular, the CAD design is passed to the slicer, which generates the toolpath. Instead of merely using the toolpath to align the mesh, the toolpath is used to regenerate the CAD model, either by updating the existing CAD model, or creating a new CAD model to reflect the current model as modified by the slicer settings. That regenerated CAD model can then be used to regenerate or update the finite element mesh. Because the regenerated CAD and finite element mesh includes voids 1002 the issues from FIG. 11A are avoided. The finite element mesh knows the voids exist because they are present in the mesh and therefore the elements can be activated in such a way that there is no missing data and no inaccurate surface information is generated. Thus in this integrated framework, step 418 from the simulated-assisted additive manufacturing method can be avoided altogether. No regression analysis or other estimation of the missing data is necessary, because none is generated in this embodiment.

It is worth noting that the integrated framework can avoid missing data, but the missing data may be avoided in other ways as well. For example, as the toolpath is generated, the activated elements on the entire can be identified so that there is no missing data that has to be estimated later. Or, in some embodiments, it may be possible or preferable to activate all of the elements.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A simulation-assisted method for generating a target model for additively manufacturing a part, wherein geometry of the target model accounts for anisotropic deformation during additive manufacture and service loading of the additively manufactured part, the method comprising:
   accessing, in memory, an uncompensated model representative of geometry of the part that does not account for anisotropic deformation during additive manufacture of the part and service loading of the additively manufactured part;
   slicing the uncompensated model, with a slicer, to generate an additive manufacture toolpath for additively manufacturing the part that does not account for anisotropic deformation during additive manufacture of the part and service loading of the additively manufactured part;
   meshing the uncompensated model to generate a plurality of meshed elements representative of surface geometry of the part that do not account for anisotropic deformation during additive manufacture of the part and service loading of the additively manufactured part;
   accessing, in memory, additive manufacture anisotropic deformation information;
   accessing, in memory, service loading anisotropic deformation information;
   simulating additive manufacture and service loading of the part based on the additive manufacture toolpath, the plurality of meshed elements representative of surface geometry of the part, the additive manufacture anisotropic deformation information, and the service loading anisotropic information to generate a plurality of simulated additively manufactured and service loaded mesh elements accounting for anisotropic deformation due to additive manufacturing and service loading;
   wherein the simulating additive manufacture and service loading of the part includes neglecting a subset of the plurality of meshed elements whereby fewer simulated additively manufacture mesh elements than the plurality of meshed elements are generated;
   estimating anisotropic deformation due to additive manufacturing and service loading of the neglected subset of the plurality of meshed elements based on
      the plurality of simulated additively manufactured and service loaded mesh elements, and
      the plurality of meshed elements representative of surface geometry of the part to supplement the plurality of simulated additively manufactured and service loaded mesh elements accounting for anisotropic deformation due to additive manufacturing and service loading;
   generating the target model for additively manufacturing the part, wherein geometry of the target model accounts for anisotropic deformation during additive manufacture and service loading of the additively manufactured part, wherein generating the target model is based on a comparison between
      the supplemented plurality of simulated additively manufactured and service loaded mesh elements that account for anisotropic deformation during additive manufacture of the part and service loading of the additively manufactured part, and the plurality of meshed elements representative of surface geometry of the part that do not account for anisotropic deformation during additive manufacture of the part and service loading of the additively manufactured part.

2. The simulation-assisted method for generating the target model of claim 1 wherein the accessing additive manufacture anisotropic deformation information includes associating the additive manufacture anisotropic deformation information with the plurality of meshed elements.

3. The simulation-assisted method for generating the target model of claim 1 wherein the accessing service loading anisotropic deformation information includes associating the service loading anisotropic deformation information with the plurality of meshed elements.

4. The simulation-assisted method for generating the target model of claim 1 wherein the additive manufacture toolpath does not include associated additive manufacture anisotropic deformation information and service loading anisotropic deformation information.

5. The simulation-assisted method for generating the target model of claim 1 wherein the estimating includes regression analysis to estimate deformation of the neglected subset of the plurality of meshed elements based on the plurality of simulated additively manufactured and service loaded mesh elements and the plurality of meshed elements representative of surface geometry of the part.

6. The simulation-assisted method for generating the target model of claim 5 wherein the regression analysis utilizes a patch-wise regression model to obtain a regression fit of deformed positions of the neglected subset of the plurality of meshed elements due to additive manufacture and service loading of the part based on the plurality of simulated additively manufactured and service loaded mesh elements accounting for anisotropic deformation due to additive manufacturing and service loading neighboring the neglected subset of the plurality of meshed elements.

7. The simulation-assisted method for generating the target model of claim 1 including converting the uncompensated model to a point cloud, deforming points in the point cloud according to the supplemented plurality of simulated additively manufactured and service loaded mesh elements, converting the deformed point cloud into a deformed model of the part that accounts for anisotropic deformation during additive manufacture and service loading of the additively manufactured part, and wherein generating the target model based on the comparison between the supplemented plurality of simulated additively manufactured and service loaded mesh elements, and the plurality of meshed elements representative of surface geometry of the part includes generating the target model based on the comparison between the deformed model of the part accounting for anisotropic deformation during additive manufacture and service loading of the additively manufactured part and the uncompensated model representative of geometry of the part that does not account for anisotropic deformation during additive manufacture of the part and service loading of the additively manufactured part.

8. The simulation-assisted method for generating the target model of claim 1 wherein the slicing, meshing, simulating, estimating, and generating the target model steps are automatically and iteratively executed until the comparison between the supplemented plurality of simulated additively manufactured and service loaded mesh elements that account for anisotropic deformation during additive manufacture of the part and anisotropic deformation during service loading of the additively manufactured part, and the plurality of meshed elements representative of surface geometry of the part that do not account for anisotropic deformation during additive manufacture of the part and service loading of the additively manufactured part are substantially similar.

9. The simulation-assisted method for generating the target model of claim 1 including generating a target design file representative of the generated target model, slicing the generated target model based on the target design file, with a slicer, to generate a target model additive manufacture toolpath, additively manufacturing an instance of the part based on the target model additive manufacture toolpath, and surface machining the instance of the part based on the target design file to finalize the instance of the part.

10. The simulation-assisted method for generating the target model of claim 9 including comparing the finalized instance of the part to a ground truth version of the part.

11. The simulation-assisted method for generating the target model of claim 1 wherein the simulating additive manufacture and service loading of the part includes conducting a finite element analysis ("FEA") by activating meshed elements representative of surface geometry of the part according to the additive manufacture toolpath to generate the plurality of simulated additively manufactured and service loaded mesh elements accounting for anisotropic deformation due to additive manufacturing and service loading.

12. The simulation-assisted method for generating the target model of claim 11 wherein the conducting of the FEA includes selecting meshed elements for activation according to the toolpath;

assigning additive manufacturing specific properties to the selected meshed elements based on material anisotropy;

assigning service loading specific properties to the selected meshed elements based on material anisotropy;

calculating displacement of the meshed elements based on the assigned additive manufacturing and service loading specific properties; and generating the plurality of simulated additively manufactured and service loaded mesh elements accounting for anisotropic deformation based on the calculated displacements of the meshed elements.

13. The simulation-assisted method for generating the target model of claim 1 wherein the slicing of the uncompensated model to generate an additive manufacture toolpath includes ignoring internal structure of the model and generating a perimeter toolpath.

14. The simulation-assisted method for generating the target model of claim 1 wherein the neglected subset of the plurality of meshed elements are neglected due to the toolpath being defined by piecewise linear movements where angle between two linear movements is sufficiently sharp such that certain elements that bead width is not expected to cover the neglected meshed elements.

15. The simulation-assisted method for generating the target model of claim 1 including 3D scanning a ground truth version of a product to obtain a mold for manufacturing the product, wherein the part is the mold.

16. The simulation-assisted method for generating the target model of claim 1 wherein generating the target model based on the comparison includes geometrically inverting the supplemented plurality of simulated additively manufactured and service loaded mesh elements relative to the plurality of meshed elements representative of surface geometry of the part that do not account for anisotropic deformation during additive manufacture of the part and service loading of the additively manufactured part.

17. The simulation-assisted method for generating the target model of claim 16 wherein generating the target model includes generating an intermediate model by geometric inversion of the supplemented plurality of simulated additively manufactured and service loaded mesh elements relative to the plurality of meshed elements representative of surface geometry of the part that do not account for anisotropic deformation during additive manufacture of the part and service loading of the additively manufactured part.

18. The simulation-assisted method for generating the target model of claim 17 including slicing the intermediate model to generate an intermediate toolpath, meshing the intermediate model, simulating additive manufacture and service loading of the part based on the intermediate toolpath, the meshed intermediate model, the additive manufacture anisotropic deformation information, and the service loading anisotropic information to generate a simulated surface accounting for anisotropic deformation due to additive manufacturing and service loading, and generating the target model for additively manufacturing the part, wherein generating the target model is based on a comparison between the simulated surface and the intermediate model.

19. A simulation-assisted method for generating target surface geometry such that when additively manufactured and service loaded the target surface geometry anisotropically deforms into a part having a desired surface geometry, the method comprising:
  slicing a model of the part to generate an additive manufacture toolpath;
  spatially discretizing the model of the part to generate a plurality of discretized elements representative of the desired surface geometry of the part;
  mapping the toolpath to the plurality of discretized elements representative of surface geometry of the part by activating discretized elements corresponding to the toolpath and assigning orientation vectors to activated discretized elements representative of the toolpath directions;
  simulating anisotropic deformation of the activated discretized elements based on the assigned orientation vectors to generate a deformation field;
  reconstructing the target surface geometry based on the deformation field and the model of the part.

20. A simulation-assisted method for generating target surface geometry of claim 19 wherein the simulating anisotropic deformation accounts for the toolpath having complex deposition directions, anisotropic thermal expansion of extruded beads along the toolpath, and slicer-determined internal geometry.

21. A simulation-assisted method for generating target surface geometry of claim 19 wherein the reconstructing the target surface geometry based on the deformation field and the model of the part includes generating revised model geometry to achieve target dimensions corresponding to the target surface geometry while accounting for anisotropic properties.

22. A simulation-assisted method for generating target surface geometry of claim 19 wherein mapping the toolpath to the plurality of finite elements representative of surface geometry of the part includes deactivating discretized elements that do not correspond to the toolpath.

23. A simulation-assisted method for generating target surface geometry of claim 19 including estimating anisotropic deformation for a subset of inactivated discretized elements.

24. A simulation-assisted method for generating target surface geometry of claim 23 wherein the estimating includes regression analysis to estimate anisotropic deformation of the subset of inactivated discretized elements based on the activated discretized elements corresponding to the toolpath and assigned orientation vectors.

25. A simulation-assisted method for generating target surface geometry of claim 24 wherein the regression analysis utilizes a patch-wise regression model to obtain a regression fit that estimates anisotropic deformation of the subset of inactivated discretized elements based on neighboring activated discretized elements corresponding to the toolpath and assigned orientation vectors.

26. A simulation-assisted method for generating target surface geometry of claim 24 wherein spatially discretizing the model of the part includes converting the model to a point cloud to generate a plurality of discretized points representative of surface geometry of the part, mapping the anisotropic deformation estimates to the point cloud, and deforming the point cloud based on the anisotropic deformation simulation and anisotropic deformation estimating, and reconstructing the target surface geometry based on the deformed point cloud and the model of the part.

27. A simulation-assisted method for generating target surface geometry of claim 19 wherein the slicing, spatially discretizing, mapping, simulating, and reconstructing the target surface geometry steps are automatically and iteratively executed using the target surface geometry as the model until iterated reconstructed target surface geometry corresponds to geometry that when additively manufactured and service loaded anisotropically deforms into the part.

28. A simulation-assisted method for generating target surface geometry of claim 19 including generating a target design file including representation of the target surface geometry, slicing the target design file, with a slicer, to generate a target model additive manufacture toolpath, additively manufacturing an instance of the part based on the target model additive manufacture toolpath, and surface machining the instance of the part based on the target design file to finalize the instance of the part, and comparing the finalized instance of the part to a ground truth version of the part.

29. A simulation-assisted method for generating target surface geometry of claim 19 wherein the slicing of the model to generate the additive manufacture toolpath includes ignoring internal structure of the model and generating a perimeter toolpath.

30. A simulation-assisted method for generating target surface geometry of claim 19 including 3D scanning a ground truth version of a product to obtain a mold for manufacturing the product, wherein the part is the mold.

31. A simulation-assisted method for generating target surface geometry of claim 19 wherein reconstructing the target surface geometry based on the deformation field and the model of the part includes geometrically inverting the deformation field relative to the model of the part.

32. A simulation-assisted method for generating a target model for additively manufacturing a part, the target model accounting for anisotropic deformation during additive manufacture and service loading, the method comprising:

accessing, in memory, a computer-aided design (CAD) model representative of geometry of the part, additive manufacture anisotropic deformation information, and service loading anisotropic deformation information;

slicing the CAD model, with a slicer, to generate an additive manufacture toolpath for additively manufacturing the part without accounting for the additive manufacture anisotropic deformation information and without accounting for the service loading anisotropic deformation information;

discretizing the CAD model to generate a CAD-based meshed model representative of surface geometry of the part including a plurality of CAD-based mesh elements;

associating the additive manufacture anisotropic deformation information with the plurality of CAD-based mesh elements;

associating the service loading anisotropic deformation information with the plurality of CAD-based mesh elements;

simulating additive manufacture of the part based on the generated additive manufactured toolpath, the CAD-based meshed model including the plurality of CAD-based mesh elements, and the associated additive manufacture anisotropic deformation information to generate a simulated meshed model of the additively manufactured part, wherein the simulated meshed model of the additively manufactured part includes a plurality of simulation-based mesh elements;

simulating service loading deformation of the simulated additively manufactured meshed model of the additively manufactured part based on the associated service loading anisotropic information to generate a deformation field representing deformation of the CAD-based mesh corresponding to simulation of additive manufacture of the part and simulation of service loading of the simulated additively manufactured part; and reconstructing the target model based on the deformation field and the CAD model representative of geometry of the part.

33. The simulation-assisted method for generating a target model for additively manufacturing a part of claim 32 wherein the simulating steps account for the toolpath having complex deposition directions, anisotropic thermal expansion of extruded beads along the toolpath, and slicer-determined internal geometry.

34. The simulation-assisted method for generating a target model for additively manufacturing a part of claim 32 wherein the reconstructing the target model based on the deformation field and the CAD model includes generating revised model geometry to achieve target dimensions corresponding to the target model while accounting for anisotropic properties.

35. The simulation-assisted method for generating a target model for additively manufacturing a part of claim 32 including estimating anisotropic deformation of a subset of the CAD-based mesh elements.

36. The simulation-assisted method for generating a target model for additively manufacturing a part of claim 35 wherein the estimating includes regression analysis to estimate anisotropic deformation of the subset of CAD-based mesh elements based on the deformation field.

37. The simulation-assisted method for generating a target model for additively manufacturing a part of claim 36 wherein the regression analysis utilizes a patch-wise regression model to obtain a regression fit that estimates anisotropic deformation of the subset of CAD-based mesh elements based on neighboring simulated CAD-based elements.

38. The simulation-assisted method for generating a target model for additively manufacturing a part of claim 35 wherein discretizing the CAD model includes converting the CAD model to a point cloud to generate a plurality of discretized points representative of surface geometry of the part, deforming the point cloud based on the anisotropic deformation simulation and anisotropic deformation estimate, and wherein the reconstructing includes reconstructing the target model based on the deformed point cloud.

39. The simulation-assisted method for generating a target model for additively manufacturing a part of claim 32 wherein the accessing, slicing, discretizing, associating the additive manufacture anisotropic deformation information, associating the service loading anisotropic deformation information, simulating additive manufacture, simulating service loading deformation, and reconstructing the target model steps are automatically and iteratively executed.

40. The simulation-assisted method for generating a target model for additively manufacturing a part of claim 32 including generating a target design file including representation of the target model, slicing the target design file, with a slicer, to generate a target model additive manufacture toolpath, additively manufacturing an instance of the part based on the target model additive manufacture toolpath, and surface machining the instance of the part based on the target design file to finalize the instance of the part, and comparing the finalized instance of the part to a ground truth version of the part.

41. A simulation-assisted additive manufacturing system for generating target part geometry, the system comprising:
 memory adapted to store:
  an initial CAD model, the initial CAD model representative of desired part geometry;
  an additive manufacture toolpath for instructing additive manufacturing equipment;
  a finite element mesh for conducting a deformation simulation;
  additive manufacture anisotropic deformation information; and
  service loading anisotropic deformation information;
 a slicer module configured to convert the initial CAD model into the additive manufacturing toolpath, wherein the slicer module is stored in memory;
 a simulation module configured to convert the initial CAD model to the finite element mesh, wherein the simulation module is stored in memory;
  wherein the simulation module is configured to simulate anisotropic deformation due to additive manufacture and service loading of a part based on the additive manufacture toolpath, the finite element mesh, the additive manufacture anisotropic deformation information, and the service loading anisotropic information to generate a deformed finite element mesh of the part;
  a compensation module configured to inversely deform the desired part geometry with the deformed finite element mesh to generate the target part geometry, wherein the target part geometry accounts for anisotropic deformation during additive manufacture and service loading of an additively manufactured part, and wherein the compensation module is stored in memory.

42. The simulation-assisted additive manufacturing system of claim 41 wherein the simulation module neglects deformation simulation of a portion of the finite element mesh and wherein the compensation module is configured to estimate deformation of the neglected portion of the deformation simulation with regression analysis and is configured to update the target part geometry according to the estimated deformation.

43. The simulation-assisted additive manufacturing system of claim 41 wherein the compensation module is configured to generate the target part geometry in the form of a compensated CAD model.

44. The simulation-assisted additive manufacturing system of claim 41 wherein the compensation module is configured to generate the target part geometry in the form of a compensated finite element mesh.

45. The simulation-assisted additive manufacturing system of claim 41 wherein the compensation module is configured to generate the target part geometry in the form of a compensated additive manufacturing toolpath.

46. The simulation-assisted additive manufacturing system of claim 41 wherein changes to the desired part geometry within any module are automatically accounted for in other modules.

47. The simulation-assisted additive manufacturing system of claim 46 wherein changes to the desired part geometry include introduction of one or more geometric features into the desired part geometry as a result of slicer module setting selections, and wherein in response to the changes to the desired part geometry as a result of slicer module setting selections, the initial CAD model is updated with the one or more geometric features.

48. The simulation-assisted additive manufacturing system of claim 46 wherein changes to the desired part geometry include introduction of one or more geometric features into the desired part geometry as a result of slicer module setting selections, and wherein in response to the changes to the desired part geometry as a result of slicer module setting selections, the finite element mesh is updated with the one or more geometric features.

49. The simulation-assisted additive manufacturing system of claim 46 including a CAD module configured to change the initial CAD model, the CAD module stored in memory.

50. The simulation-assisted additive manufacturing system of claim 49 wherein changes to the desired part geometry include introduction of one or more geometric features into the desired part geometry as a result of the changes to the initial CAD model, and wherein in response to the changes to the desired part geometry, the slicer module is configured to update the toolpath and the simulation module is configured to update the finite element mesh.

51. The simulation-assisted additive manufacturing system of claim 49 wherein the CAD module, slicer module, and simulation module communicate changes to changes to the desired part geometry to each other.

* * * * *